(12) United States Patent
Pavlov et al.

(10) Patent No.: US 12,474,332 B2
(45) Date of Patent: Nov. 18, 2025

(54) NANOCLUSTER-ANTIBODY CONJUGATES AND USES THEREOF

(71) Applicants: ASOCIACIÓN CENTRO DE INVESTIGACIÓN COOPERATIVA EN BIOMATERIALES—CIC BIOMAGUNE, San Sebastián (ES); FUNDACION TECNALIA RESEARCH & INNOVATION, Derio-Bizkaia (ES)

(72) Inventors: Valery Pavlov, Astigarraga (ES); Veronica Mora Sanz, Saragossa (ES); Nerea Briz Iceta, San Sebastián (ES); Laura Saa Peña, San Sebastián (ES)

(73) Assignees: ASOCIACIÓN CENTRO DE INVESTIGACIÓN COOPERATIVA EN BIOMATERIALES—CIC BIOMAGUNE, San Sebastian (ES); FUNDACION TECNALIA RESEARCH & INNOVATION, Derio-Bizkaia (ES)

( * ) Notice: Subject to any disclaimer, the term of this patent is extended or adjusted under 35 U.S.C. 154(b) by 892 days.

(21) Appl. No.: 17/768,211

(22) PCT Filed: Oct. 9, 2020

(86) PCT No.: PCT/EP2020/078411
§ 371 (c)(1),
(2) Date: Apr. 11, 2022

(87) PCT Pub. No.: WO2021/069663
PCT Pub. Date: Apr. 15, 2021

(65) Prior Publication Data
US 2023/0041162 A1   Feb. 9, 2023

(30) Foreign Application Priority Data

Oct. 11, 2019  (EP) .................................... 19382894

(51) Int. Cl.
*G01N 33/543* (2006.01)
*G01N 33/553* (2006.01)

(52) U.S. Cl.
CPC ..... *G01N 33/54346* (2013.01); *G01N 33/553* (2013.01)

(58) Field of Classification Search
None
See application file for complete search history.

(56) References Cited

PUBLICATIONS

Cheng et al., Au nanocluster-embedded chitosan nanocapsules as labels for the ultrasensitive fluorescence immunoassay of *Escherichia coli* O157:H7, Analyst, 2018, 143, pp. 4067-4073, published online Jul. 31, 2018. (Year: 2018).*

(Continued)

*Primary Examiner* — Rebecca M Giere
(74) *Attorney, Agent, or Firm* — Squire Patton Boggs (US) LLP

(57) ABSTRACT

The present invention provides metallic nanocluster (NC)—antibody (Ab) conjugate, wherein the NC has an average size lower than 3 nm and the conjugate: (a) comprises one single NC, (b) the antibody maintains the binding ability; and (c) has a catalytic activity selected from peroxidase-like and photocatalytic activity.
The invention also provides a process for the preparation of the conjugate as well as compositions, kits and uses in therapy and diagnostics.
Advantageously, the conjugate of the invention shows improved catalytic activity, providing a remarkable improved immunoassay's sensitivity.

18 Claims, 9 Drawing Sheets

(56) References Cited

PUBLICATIONS

Huang et al., "Single-Domain Antibody-Conjugated Nanoaggregate-Embedded Beads for Targeted Detection of Pathogenic Bacteria", Chem. Eur. J. 2009, 15, pp. 9330-9334. (Year: 2009).*

International Search Report and Written Opinion mailed Dec. 15, 2020 for International Application No. PCT/EP2020/078411, 15 pages.

Ackerson, et al., "Rigid, Specific, and Discrete Gold Nanoparticle/Antibody Conjugates", Journal of the American Chemical Society; Mar. 1, 2006; vol. 128(8); doi:10.1021/ja0555668.

Goldman, et al., "Conjugatoin of Luminescent Quantum Dotswiht Antibodies using an engineered Adaptor Protein to provide new reagents for Fluoroimmunoassays", Analytical Chemistry, American Chemical Society; Feb. 15, 2002; vol. 74(4), pp. 841-847; doi:10.1021/AC010662M.

Li, et al., "Preliminary studies of application of CdTe nanocrystals and dextran-Fe3O4 magnetic nanoparticles in sandwich immunoassay", Clinica Chimica Acta; Feb. 15, 2007; vol. 378(1-2), pp. 168-174; doi:10.1016/J.CCA.2006.11.013.

Li, et al., "Sensitive immunoassay for porcine pseudorabies antibody based on fluorescence signal amplification induced by cation exchange in CdSe nanocrystals", Microchimica Acta; published online Dec. 28, 2012; vol. 180(3-4), pp. 303-310; doi:10.1007/S00604-012-0934-Y.

Lin, et al., "Studies on quantum dots synthesized in aqueous solution for biological labeling via electrostatic interaction", Analytical Biochemistry; Aug. 15, 2003; vol. 319(2), pp. 239-243; doi:10.1016/S0003-2697(03)00287-2.

Lin, et al., "Synthesis and Surface Modification of Highly Fluorescent GoldNanoclusters and Their Exploitation for Cellular Labeling", Proc of SPIE; Feb. 17, 2010; vol. 7575, XP040517382 [X] 1-4,12-14.

Liu J et al., "One-step synthesis of antibody-stabilized aqueous colloids of noble metal nanoparticles", Colloids and Surfaces A: Physicochemical and Engineering Aspects 2012; vol. 404, pp. pp. 112-118.

Morrison, et al., "Chimeric human antibody molecules: Mouse antigen-binding domains with human constant region domains", PNAS; Nov. 1984; vol. 21, pp. 6851-6855.

Signor, et al., "Matrix-assisted Laser Desorption/Ionization Time of Flight ( MALDI-TOF) Mass Spectrometric Analysis of Intact Proteins Larger than 100 kDa", Journal of Visualized Experiments; Sep. 2013; vol. 79, e50635, pp. 1-7.

\* cited by examiner (A)

(B)

(A)

(B)

(A)

(B)

(A)

(B)

(A)

(B)

form of the invention. These data support the value of the conjugates of the invention in the field of immunoassays: the reduction in the limit of detection may allow the physician the detection/diagnosis in early stages of the disease

NANOCLUSTER-ANTIBODY CONJUGATES AND USES THEREOF

CROSS-REFERENCE TO RELATED APPLICATIONS

The present application is a 35 U.S.C. § 371 national-phase filing of International Application No. PCT/EP2020/078411, filed on Oct. 9, 2020, which claims the benefit of European Patent Application EP19382894.4, filed on Oct. 11, 2019, both of which applications are incorporated herein by reference in their entirety.

TECHNICAL FIELD

The present invention is related to the immunoassay field. In particular, the present invention relates to novel NC-antibody conjugates with remarkably improved sensitivity and which can be obtained by a simple process based on mild conditions which do not negatively affect the native properties of the antibody. The present invention further provides a kit comprising the conjugate of the invention and uses thereof.

BACKGROUND ART

The ability to detect and identify trace quantities of analytes has become increasingly important in many scientific disciplines, ranging from part per billion analyses of pollutants in sub-surface water to analysis of treatment drugs and metabolites in blood serum. Additionally, the ability to perform assays in multiplex fashion greatly enhances the rate at which information can be acquired. Devices and methods that accelerate the processes of elucidating the causes of disease, creating predictive and or diagnostic assays, and developing effective therapeutic treatments are valuable scientific tools.

Sensitive immunodetection relies on multiple factors including specificity and affinity of the antibodies employed, and amplification of the signals from detected antigens. Several detection systems such as avidin-biotin complex (ABC), peroxidase anti-peroxidase (PAP), or polymer-based reagents have been used in traditional chromogenic techniques. They provide enhanced sensitivity through amplification; however, these systems also involve three or more steps, are not easy to quantify, and lack dynamic range.

Fluorescence-based immunodetection could potentially overcome the limitations and simplify the multi-step chromogenic methods by labelled primary or secondary antibodies; however, the trade-offs include need for optimizing conjugation for each primary antibody and loss of amplification due to non-crosslinked fluorophores on the secondary antibodies. Furthermore, the unstable and photobleachable nature of conventional fluorophores make them unpractical for long term storage and observation, especially in tissue banking for clinical studies.

Semiconductor nanocrystals, e.g., quantum dots (QDs), that do not photobleach and offer broad spectral absorption and narrow emission profiles, enable excitation by a single low wavelength source and multiplex analysis. In literature, some examples of the use of nanoclusters (NCs) in immunoassays can be found. The specific properties of NCs arise from their subnanometric dimensions, comparable to the Fermi wavelength of electrons. The spatial isolation of free electrons in NCs provide electronic transitions tunable with size.

In general, NCs with a measurable property are firstly synthesized using an organic molecule as stabilizer scaffold (such as bovine serum albumin (BSA), lysozyme, GOx, HRP, glutathione or DNA) and, in a subsequent stage, they are bound to an antibody. Here, there are two main drawbacks: on one hand, the formation of the NC causes a partial or complete loss of the inherent biological properties of the scaffold, due to the extreme reaction conditions; and (b) the conditions of conjugation need to be optimized case-by-case.

The above would explain why the NCs used in detecting an analyte require complex preparation processes wherein the NC is firstly produced and then it is conjugated (either covalently or non-covalently) to the antibody under milder conditions.

Therefore, in spite of the efforts made, there is the need of providing a simple approach that offers avidity and detectable signal amplification benefits along with high sensitivity.

SUMMARY OF INVENTION

The present inventors have developed a novel NC-Ab conjugate which shows not only fluorescence properties, but also catalytic properties, making it especially useful in immunoassays.

Thus, the present invention provides in a first aspect a metallic nanocluster (NC)—antibody (Ab) conjugate, wherein the NC has an average size lower than 3 nm and the conjugate: (a) comprises one single NC, (b) the antibody maintains the binding ability; and (c) has a catalytic activity selected from peroxidase-like and photocatalytic activity.

The present inventors obtained TEM images from the conjugates of the invention after their synthesis and they confirmed that the distance between NCs was greater than the size of antibody. So this was indicative that the conjugate of the invention only included one NC per antibody.

In addition, FIG. 2 shows that there is no change in CD spectrum when the antibody alone was compared with the conjugate of the invention. This means that the inclusion of the NC in the structure of the antibody does not negatively affect antibody's conformation and, hence, its functionality. This was further confirmed testing the affinity of the antibody forming part of the conjugate of the invention towards its antigen. As it can be derived from FIGS. 6, 7, and 8, the antibody forming part of the conjugate of the invention retains the affinity and binds to the antigen. The antibody forming part of the conjugate of the invention is not only functional, but also dose-responding and sensitive to the amount of antigen present in the test.

In addition to the above, the conjugate of the invention not only show the ability of binding to antibody's target, but also shows a strong enzymatic activity. As it is show below, the conjugates of the invention show catalytic activity, either using chromogenic or fluorogenic substrates. Surprisingly, the present inventors have found that the conjugate of the invention shows improved catalytic activity, providing a remarkable improved immunoassay's sensitivity. FIG. 13 and Table 1 provide the limit of detection conferred by the conjugates of the invention and one of the state of the art (the latter based on a conjugate of an antibody with HRP). As it can be concluded, there is a remarkable reduction of the limit of detection (up to 56 times) when the conjugate of the invention was used. These data support the value of the conjugates of the invention in the field of immunoassays: the reduction in the limit of detection may allow the physician the detection/diagnosis in early stages of the disease (wherein the amount of analyte is not high), which may improve the life expectation in particular disease conditions.

Therefore, the present conjugate means a great advance in immunoassays, providing a potent detection tool in early stages.

As it is shown below, the inventors have developed a method for the synthesis of the conjugate of the invention based on the use of the antibody as a scaffold for the stabilization of NC.

Thus, in a second aspect the present invention provides a process for preparing the conjugate as defined in the first aspect of the invention, the process process for preparing a metallic nanocluster-antibody conjugate as defined in the first aspect of the invention, which comprises the step (a) of mixing an aqueous metallic solution comprising one or more different metal ions with a solution comprising the antibody and a buffer; wherein:
- the antibody is at excess weight with respect the total weight of metal ions in the solution,
- the process being performed at pH and T conditions which maintain the native three-dimensional configuration of the antibody; and
- the process further comprising, when the nanocluster is made of one or more different metals, the steps of: (b) adding a reducing agent to the mixture resulting from step (a), provided that the antibody is at an excess weight ratio with respect to the weight of reducing agent; and (c) removing the residual reducing agent and free metal ions from the solution.

The synthesis of antibodies modified with NC is carried out under physiological conditions, which do not affect the antibody structure. Usually the synthetic conditions for the synthesis of NC stabilized with proteins require extreme conditions such as high reducing agent amounts, being the reducing agent in an excess weight ratio with respect the amount of antibody. These conditions cause the denaturalization of the proteins and end up in the loss of their biological functions.

Surprisingly, and contrary to the prior art, the present inventors have found that performing the process under antibody weight ratio excess with respect to the reducing agent, it is successfully obtained the conjugate and, what is even more important, the resulting conjugate shows remarkable catalytic properties.

Without being bound to the theory, the present inventors believe that when the process of the invention is performed the amount of reducing agent added is crucial for the NC to be within the structure of the antibody. The reducing agent, in addition to reducing metal ions, also reduces the disulfide bonds that bind the amino acid chains, making sulfide groups accessible through which metal ions have a high affinity and to which they bind. Under the particular conditions of the process, the amount of reducing agent is the minimum to allow the efficient formation of the NC without negatively affecting native antibody structure. In the step of removing the ions that do not form the NC by filtration through a membrane, the reducing agent is also removed.

In addition, the particular weight ratios pointed out above also contributes to the fact that a single NC of an appropriate size is formed.

In view of the above, the conjugate of the invention can alternatively be defined in terms of the process for its preparation. Therefore, in a third aspect the present invention provides a NC-antibody conjugate obtainable by the process as defined in the second aspect of the invention.

In a fourth aspect, the present invention provides metallic nanocluster-antibody conjugate as defined in the first or third aspect of the invention, for use in diagnostics or therapy.

In a fifth aspect the present invention provides a kit comprising the metallic nanocluster-antibody conjugate as defined in the first or third aspect of the invention, together with one or more reagents selected from a solid support, buffers, blocking agents, enzymatic substrates, or capturing antibodies, among others.

In a sixth aspect the present invention provides an aqueous composition comprising the conjugate as defined in the first aspect of the invention and a buffer.

In a seventh aspect, the present invention provides a pharmaceutical composition comprising a therapeutically effective amount of the conjugate as defined in the first aspect of the invention together with one or more pharmaceutically acceptable excipients and/or carriers.

Finally, in an eighth aspect the present invention provides an in vitro method for determining the presence of an analyte in a sample, the method comprising the step of incubating the test sample with the conjugate as defined in the first or third aspect of the invention, together with a detectable enzymatic substrate, and quantifying the catalytic activity.

DETAILED DESCRIPTION OF THE INVENTION

Figure 1:
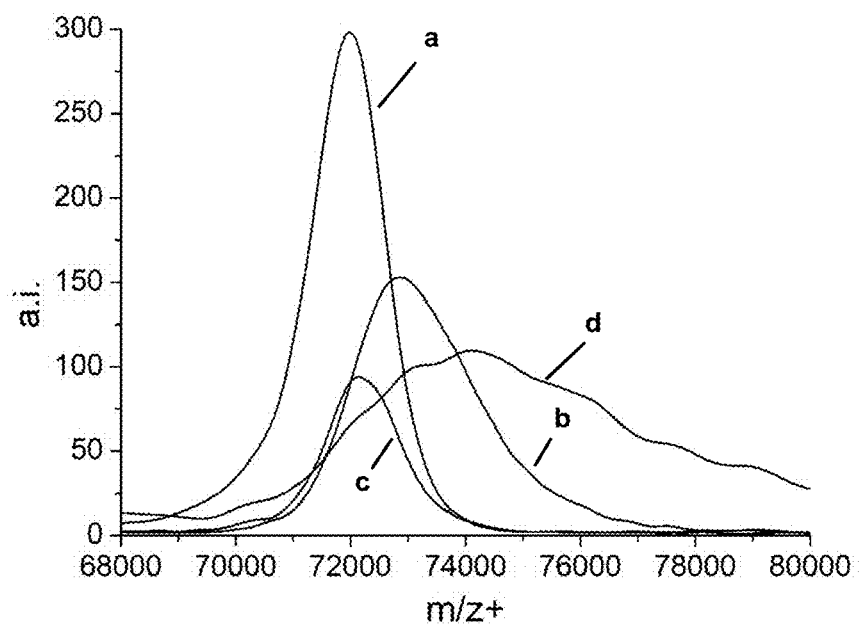
FIG. 1: MALDI-TOF mass spectra of anti-BSA IgG (curve a), CdS NC-anti-BSA IgG (curve b), Ag/Pt NC-anti-BSA IgG (curve c) and Au/Pt NC-anti-BSA IgG (curve d), (m/z$^+$, z=2).

For the purposes of the invention, any ranges given include both the lower and the upper end-points of the range. Ranges given, such as temperatures, times, and the like, should be considered approximate, unless specifically stated.

In a first aspect the present invention provides a metallic nanocluster-antibody conjugate.

In the present invention the term "metallic nanocluster" is defined as a particle comprising or consisting of one or more metal atoms or ions.

In one embodiment of the first aspect of the invention, optionally in combination with any of the embodiments provided below, the metal atom(s) or ion(s) is/are a transition metal atom(s) or ion(s). In a more particular embodiment, optionally in combination with any of the embodiments provided above or below, the metal atom or ion is selected from the group consisting of: copper, gold, silver, nickel, zinc, titanium, chromium, iron, cobalt, palladium, cadmium, ruthenium, rhodium, iridium, platinum and any combination thereof. In a yet more particular embodiment, optionally in combination with any of the embodiments provided above or below, the nanocluster comprises a metallic salt, such as CdS, ZnS, HgS, CdSe, ZnSe, HgSe, CdTe, ZnTe, HgTe, $CeO_2$, $TiO_2$, or ZnO, among others. In an alternative embodiment, the metallic nanocluster comprises a mixture of two metals. In an alternative embodiment, the metallic nanocluster consists of a mixture of two metals. In still another embodiment, optionally in combination with any of the embodiments provided above or below, the mixture of two metals is made from the group: Au, Ag, Pt, Ce, Pd, Rh, Ni, Al, Co, Ru, Ir, Os, Pb, Sr, Ba, Zr, Mo, Tc, Zn, Ti, W, V, Cr, Cu, Nb. In one embodiment of the first aspect of the invention, optionally in combination with any of the embodiments provided below, the nanocluster is made of Ag/Pt or Au/Pt. In another embodiment of the first aspect of the invention, optionally in combination with any of the embodiments provided above or below, the nanocluster is made of Pt and a second metal, being the Pt in a molar ratio excess with respect the other metal. In another embodiment of the first aspect of the invention, optionally in combination with any of the embodiments provided above or below, the nanocluster is made of Ag:Pt and the molar ratio is from 1:1 to 1:10, particularly 1:2. In another embodiment of the first aspect of the invention, optionally in combination with any of the embodiments provided above or below, the nanocluster is made of Au:Pt and the molar ratio is from 1:1 to 1:10, particularly 1:5.

In the present invention the term "molar ratio" refers to the number of moles of one entity (for example, Ag or Au) with respect the number of moles of another entity (for example, Pt).

The size of the nanocluster is lower than 3 nanometers (nm). In a particular embodiment of the first aspect of the invention, optionally in combination with any of the embodiments provided below, the metal nanocluster has a diameter of about 1-2 nm.

The size of the metal nanocluster can be measured by any method known by the expert, for example directly by mass spectrometry, transmission electron microscopy (TEM) such as high-resolution transmission electron microscopy (HR-TEM) or scanning transmission electron microscopy (STEM); or indirectly by its fluorescent emission properties. In one embodiment of the first aspect of the invention, the size is measured by TEM.

The conjugate of the invention is characterized the fact that the NC is embedded, either partially or completely, within antibody's structure. The confirmation that the NC is embedded within antibody's structure can be obtained from assays as those provided below, wherein it is confirmed that the nanocluster is not located in the Fc region.

The conjugate of the invention is also characterized by having catalytic activity. This ability can be determined using any routine test such as an ELISA, using any available reagent and under well-known reaction conditions. An example of ELISA usable to determine catalytic activity is provided below in the Examples section. The selection of the reagents will determine the nature of the catalytic activity to be tested.

In one embodiment of the first aspect of the invention, optionally in combination with any of the embodiments provided above or below, the nanocluster is made of one or two different metals and the conjugate has peroxidase-like activity. In an alternative embodiment of the first aspect of the invention, optionally in combination with any of the embodiments provided above or below, the nanocluster is made of a metallic salt and the conjugate has photocatalytic activity.

In the present invention, the term "peroxidase-like activity" means that the conjugate has the ability of catalyzing the breakdown of $H_2O_2$ by an electron donor and oxidation of a variety of organic and inorganic compounds well-known and available to those skilled in the art. In addition to $H_2O_2$ the reaction can also use as substrate a chromogenic one, such as TMB.

In the present invention, the term "photocatalytic activity" means the ability of the conjugate to speed up a certain reaction ("photoreaction") as a catalyst in combination with light (sunlight, ultraviolet light).

In one embodiment of the first aspect of the invention, optionally in combination with any of the embodiments provided above or below, the metallic nanocluster is covalently bound to —S— radicals located in the hinge region of the antibody.

As used herein, the term "antibody" refers to a polypeptide comprising a framework region from an immunoglobulin gene or fragments thereof that specifically binds and recognizes an antigen. The recognized immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively. Typically, the antigen-binding region of an antibody will be most critical in specificity and affinity of binding. In some embodiments, antibodies or fragments of antibodies may be derived from different organisms, including humans, mice, rats, hamsters, camels, etc. Antibodies of the invention may include antibodies that have been modified or mutated at one or more amino acid positions to improve or modulate a desired function of the antibody (e.g. glycosylation, expression, antigen recognition, effector functions, antigen binding, specificity, etc.).

An exemplary immunoglobulin (antibody) structural unit comprises a tetramer. Each tetramer is composed of two identical pairs of polypeptide chains, each pair having one "light" (about 25 kD) and one "heavy" chain (about 50-70 kD). The N-terminus of each chain defines a variable region of about 100 to 110 or more amino acids primarily responsible for antigen recognition. The terms variable light chain (VL) and variable heavy chain (VH) refer to these light and heavy chains respectively.

Methods for humanizing or primatizing non-human antibodies are well known in the art. Generally, a humanized antibody has one or more amino acid residues introduced into it from a source which is non-human. These non-human amino acid residues are often referred to as import residues, which are typically taken from an import variable domain. Humanization can be essentially performed following the method of Winter and co-workers (see, e.g., Morrison S. L. et al., 1984)), by substituting rodent CDRs or CDR sequences for the corresponding sequences of a human antibody. Accordingly, such humanized antibodies are chimeric antibodies, wherein substantially less than an intact human variable domain has been substituted by the corresponding sequence from a non-human species. In practice, humanized antibodies are typically human antibodies in which some CDR residues and possibly some FR residues are substituted by residues from analogous sites in rodent antibodies. For example, polynucleotides comprising a first sequence coding for humanized immunoglobulin framework regions and a second sequence set coding for the desired immunoglobulin complementarity determining regions can be produced synthetically or by combining appropriate cDNA and genomic DNA segments. Human constant region DNA sequences can be isolated in accordance with well-known procedures from a variety of human cells.

A "chimeric antibody" is an antibody molecule in which (a) the constant region, or a portion thereof, is altered, replaced or exchanged so that the antigen binding site (variable region) is linked to a constant region of a different or altered class, effector function and/or species, or an entirely different molecule which confers new properties to the chimeric antibody, e.g., an enzyme, toxin, hormone, growth factor, drug, etc.; or (b) the variable region, or a portion thereof, is altered, replaced or exchanged with a variable region having a different or altered antigen specificity. The preferred antibodies of, and for use according to the invention include humanized and/or chimeric monoclonal antibodies.

In one embodiment, the antibody is conjugated to an "effector" moiety. The effector moiety can be any number of molecules, including labeling moieties such as radioactive labels or fluorescent labels, or can be a therapeutic moiety. Such effector moieties include, but are not limited to, an anti-tumor drug, a toxin, a radioactive agent, a cytokine, a second antibody or an enzyme. In some embodiments, the antibody is linked to an enzyme that converts a prodrug into a cytotoxic agent. Examples of cytotoxic agents (e.g. toxins) include, but are not limited to ricin, doxorubicin, daunorubicin, taxol, ethidium bromide, mitomycin, etoposide, tenoposide, vincristine, vinblastine, colchicine, dihydroxy anthracin dione, actinomycin D, diphteria toxin, Pseudomonas exotoxin (PE) A, PE40, abrin, and glucocorticoid and other chemotherapeutic agents, as well as radioisotopes. Techniques for conjugating therapeutic agents to antibodies are well known in the state of the art.

Suitable detectable markers include, but are not limited to, a radioisotope, a fluorescent compound, a bioluminescent compound, chemiluminescent compound, a metal chelator or an enzyme. Techniques for conjugating detectable markers to antibodies are well known in the state of the art.

In another embodiment of the first aspect of the invention, optionally in combination with any of the embodiments provided above or below, the conjugate is selected from:
(a) a conjugate which consists of a nanocluster made of Au and Pt, which is covalently bound to —S— moieties from the hinge region of an antibody, particularly an IgG antibody;
(b) a conjugate which consists of a nanocluster made of Ag and Pt, which is covalently bound to —S— moieties from the hinge region of an antibody, particularly an IgG antibody;
(c) a conjugate which consists of a nanocluster made of CdS, which is covalently bound to —S— moieties from the hinge region of an antibody, particularly an IgG antibody, wherein the size of the nanocluster referred in any of the conjugates (a) to (c) is comprised from 1 to 2.3 nm.

In a second aspect the present invention provides a process for obtaining the conjugate as defined in the first aspect of the invention.

In a first step (step (a)) an aqueous metallic solution comprising one or more metal salts is mixed with a buffered antibody solution.

In one embodiment, the aqueous metallic solution referred in step (a) comprises water and a single metal salt or, alternatively, consists of water and two metal salts. The aqueous metallic solution can be prepared by merely mixing the water with the metallic salt(s). In case that the aqueous metallic solution comprises two metallic salts, the solution can be prepared by adding to water the two metallic salts or, alternatively, by preparing one metallic solution to each one of the metallic salts and then, mix them.

In an embodiment the metal salt is selected from the group consisting of: $HAuCl_4$, $AuCl$, $AuCl_3$, $KAuCl_4$, $AuI$, $AuBr_3$, $Au(OH)_3$, $HAuBr_4$, $AgNO_3$, $AgCl$, $Ag_2CO_3$, $Ag_2SO_4$, $AgClO_4$, $AgI$, $AgCN$, $AgNO_2$, $AgNO_3$, $AgF$, $AgPF_6$, $AgOCN$, $Ag_3PO_4$, $AgF_2$, $CuSO_4$, $CuI$, $CuCl$, $CuCl_2$, $CuBr$, $CuBr_2$, $CuCN$, $CuF$, $CuF_2$, $Cu(ClO_4)_2$, $Cu(NO_3)_2$, $Cu(CO_2CH_3)_2$, $Ni(OCOCH_3)_2$, $NiCl_2$, $NiSO_4$, $Ni(NO_3)_2$, $K_2Ni(CN)_4$, $Ni(ClO_4)_2$, $NiBr_2$, $NiI_2$, $Ni(OH)_2$, $NiCO_3$, $NiF_2$, $NiC_2O_4$, $ZnSO_4$, $ZnI$, $ZnCl$, $ZnCl_2$, $ZnBr$, $ZnBr_2$, $ZnCN$, $ZnF$, $ZnF_2$, $Zn(ClO_4)_2$, $Zn(NO_3)_2$, $Zn(CO_2CH_3)_2$, $ZnSO_4$, $(C_6H_6O_7)_2Zn_3$, $(CH_3CO_2)_2Zn$, $Ti[OCH(CH_3)_2]_4$, $Ti(OCH_2CH_2CH_2CH_3)_4$, $Ti[OCH_2CH(C_2H_5)(CH_2)_3CH_3]_4$, $CrCl2$, $CrCl3$, $CrF2$, $CrF3$, $CrBr2$, $CrBr3$, $CrI2$, $CrI3$, $Cr(ClO_4)_3$, $K_3Cr(C_2O_4)_3$, $Cr_2(SO_4)_3$, $CrPO_4$, $FeCl_2$, $FeCl_3$, $Fe(NO_3)_3$, $Fe(NO_3)_2$, $Fe(ClO_4)_3$, $C_{12}H_{14}FeO_{12}$, $FeSO_4$, $C_6H_5FeO_7$, $Co(NO_3)_2$, $Co(SCN)_2$, $CoCl_2$, $CoF_2$, $CoF_3$, $CoI_2$, $CoBr_2$, $CoCO_3$, $Co_3(PO_4)_2$, $CoSO_4$, $Co(ClO_4)_2$, $Co(OH)_2$, $(CH_3CO_2)_2Co$, $(CF_3COO)_2Pd$, $C_{10}H_{18}O_4Pd$, $[(C_6H_5)_3P]_2PdCl_2$, $Cd(NO_3)_2$, $Cd(OCOCH_3)_2$, $C_{12}H_{20}CdN_2S_4$, $C_{12}H_{22}CdO_{14}$, $CdCl_2$, $CdSO_4$, $CdI_2$, $CdCO_3$, $Cd(ClO_4)_2$, $CdBr_2$, $Cd(OH)_2$, $RuCl_3$, $[Ru(NH_3)_6]Cl_2$, $[Ru(NH_3)_6]Cl_3$, $RuI_3$, $Ru(NO)Cl_3$, $[Ru(NH_3)_5Cl]Cl_2$, $H_{15}Cl_2N_6Ru$, $[(CF_3COO)_2Rh]_2$, $ClRh(P(C_6H_4SO_3\cdot Na)_3)_3$, $Rh(NO_3)_3$, $IrCl_3$, $H_2Cl_6Ir$, $IrCl_4$, $Ir_4(CO)_{12}$, $IrBr_3$, $[Ir(NH_3)_5Cl]Cl_2$, $PtCl2$, $PtCl4$, $H_2PtCl_6$, $K_2PtCl_4$, $K_2PtCl_6$, $(NH_4)_2PtCl_6$, $Pd(NO_3)_2$, halides of Gd, Tb, Yb, Er, Cy, Nd, other lanthanides salts, and a combination thereof. In a preferred embodiment the metallic salt is an Au-metallic salt, Pt-metallic salt, Ag-metallic salt, a Cd-metallic salt, or any combination thereof. In another embodiment, the metallic salt is $HAuCl_4$, $AgNO_3$, $CdNO_3$ or $K_2PtCl_4$, or any combination thereof.

The buffered antibody solution is prepared by dissolving the antibody in a buffer, under adequate conditions of pH and ionic strength for maintaining its structure after the addition of the metallic salts. The selection of the buffer is based on isoelectric point (pi) of the antibody. The pI value can be understood as the pH at which the antibody carries no net electrical charge or is electrically neutral in the statistical mean. The pI can be easily calculated from the amino acid sequence forming the antibody and using well-known algorithms. Thus, once the pI value of the antibody is known, the skilled person will be able to select the buffer which provides the pH corresponding to the isoelectric point. Illustrative non-limitative examples of buffers are: phosphoric acid or salts thereof (such as PBS), acetic acid or salts thereof, citric acid or salts thereof, morpholine or salts thereof, 2-(N-morpholino) ethanesulfonic acid (MES) or salts thereof, histidine or salts thereof, glycine or salts thereof, tris (hydroxymethyl) aminomethane (TRIS) or salts thereof, (4-(2-hydroxyethyl)-I-piperazineethanesulfonic acid (HEPES) or salts thereof. In another embodiment, the buffered antibody solution has a pH from 6 to 8, particularly from 6.5 to 7.5, particularly of 6.6, 6.7, 6.8, 6.9, 7, 7.1, 7.2, 7.3, 7.4, or 7.5.

In a second step the reducing agent solution is added such as the antibody is at an excess weight ratio with respect to the reducing agent in the solution resulting from this step (b). In one embodiment of the second aspect of the invention, optionally in combination with any of the embodiments provided above or below, the weight ratio antibody:reducing agent is from $1:10^{-6}$ to 1:0.9, from $1:10^{-4}$ to 1:0.2, or from $1:10^{-3}$ to 1:0.2.

The reducing agent can be any of those known by the expert in the field. In a particular embodiment the reducing agent can be sodium ascorbate, tannic acid, hydrazine, sodium borohydride, sodium cyanoborohydride, dextrose, dimethylamine borane, 2,5 diaminobenzenesulfonic acid, 1,2-hexadecanediol, or a mixture thereof. In another embodiment, the reducing agent is sodium sulphide or sodium borohydride.

In another embodiment of the second aspect of the invention, optionally in combination with any of the embodiments provided above or below, the reducing agent is at a weight ratio with respect to the total weight of metal ions from 0.5:1 to an excess of reducing agent, from 0.6:1 to $1:10^2$ or from 0.8:1 to 1:10.

In another embodiment of the second aspect of the invention, optionally in combination with any of the embodiments provided above or below, the weight ratio antibody:total weight of metal ions is from $1:10^{-6}$ to 1:0.9 or from $1:10^{-5}$ to $1:10^{-2}$.

The expression "weight ratio" when used in the present invention, refers to the relation between the amount of one entity (either the antibody, reducing agent or metallic ions) with respect the amount of another entity, being expressed the amount in the same units (such as "mg").

In one embodiment of the process of the second aspect of the invention, the aqueous metallic solution comprises Au and Pt metal ions, and the reducing agent is sodium borohydride. In another embodiment of the process of the second aspect of the invention, the aqueous metallic solution comprises Ag and Pt metal ions, and the reducing agent is sodium borohydride. In another embodiment of the process of the second aspect of the invention, the aqueous metallic solution comprises Cd metal ions, and the reducing agent is sodium sulphide.

In another embodiment of the second aspect of the invention, the solution resulting from step (a) is maintained at dark for a period of time, prior to the addition of the reducing agent; particularly for a period of time lower than 5 hours, lower than 4 hours, lower than 3 hours, lower than 2 hours, or lower than 1 hour; particularly the period of time in dark is from 15 to 45 minutes, particularly from 25 to 35 minutes, particularly 30 minutes. Thus, it is avoided the undesirable oxidation of the antibody triggered by photons of surrounding light, guaranteeing the only oxidation effect due to the metal ions.

In step (c) the reducing agent and metallic salts are remove from the reaction medium. Thus, NCs growth is stopped. The removal of the metallic free ions can be performed using routinely means, such as filtration using a commercially membrane, with a molecular weight cut off from 30 kDa to 100 kDa or by dialysis.

In another embodiment of the process of the second aspect of the invention, the process further comprises a step of isolation and/or drying of the conjugate of the invention.

For performing the isolation and drying routine techniques can be used, such as filtration or freeze-drying.

In another embodiment of the second aspect of the invention, optionally in combination with any of the embodiments provided above or below, the process is performed at room temperature, particularly at a temperature from 15 to 35° C., particularly from 18 to 30° C., particularly from 20 to 27° C.

In another embodiment of the second aspect of the invention, optionally in combination with any of the embodiments provided above or below, the solution is vigorously stirred.

In a third aspect, the present invention provides the conjugate obtainable by the process of the second aspect of the invention. All the embodiments provided above, under the first and second aspects of the invention are also embodiments of the conjugate of the third aspect of the invention.

In a fifth aspect the present invention provides a kit comprising the conjugate as defined in the first or third aspect of the invention together with one or more solid support, buffers, washing solutions, blocking agents, enzymatic substrates or secondary antibodies, all them commercially available. These elements include antibody against BSA and PSA, casein, plastic microplates, microparticles, PBST. All the embodiments provided above under the first aspect of the invention, are embodiments of the conjugate referred in the fifth aspect of the invention.

In the present invention the term "solid support" covers embodiments such as a filter, a membrane, a magnetic or fluorophore-labeled bead, a silica wafer, glass, metal, ceramics, plastics, a chip, a target for mass spectrometry, a matrix, a bead or microtiter well.

Illustrative non-limitative examples of blocking agents are bovine serum albumin, gelatin, milk protein and non-specific IgG antibody, among others.

The selection of the components forming part of the kit will be determined on the basis of the particular immunoassay to be performed. A non-exhaustive list of immunoassays includes: competitive and non-competitive formats, enzyme linked immunosorption assays (ELISA), microspot assays, Western blots, gel filtration and chromatography, immunochromatography, immunohistochemistry, flow cytometry or fluorescence activated cell sorting (FACS), microarrays, and more. Such techniques can also be used in situ, ex vivo, in vitro, or in vivo, e.g., for diagnostic imaging.

Thus, if the kit of the invention is for use in an ELISA test, the kit may comprise a solid support, a blocking buffer, the conjugate of the invention and an enzymatic substrate, either chromogenic or fluorogenic, and optionally a secondary labelled-antibody against the antibody forming part of the conjugate of the invention (depending on whether the ELISA is a direct or indirect ELISA).

In another aspect the present invention provides a pharmaceutical composition comprising the conjugate of the invention.

The expression "therapeutically effective amount" as used herein, refers to the amount of living microorganisms that, when administered, is sufficient to prevent development of, or alleviate to some extent, one or more of the symptoms of the disease which is addressed. The particular dose of living microorganisms administered according to this invention will of course be determined by the particular circumstances surrounding the case, including the compound administered, the route of administration, the particular condition being treated, and the similar considerations.

The expression "pharmaceutical composition" refers to those compositions with a beneficial effect in humans and non-humans.

The expression "pharmaceutically or veterinary acceptable excipients or carriers" refers to pharmaceutically acceptable materials, compositions or vehicles. Each component must be pharmaceutically acceptable in the sense of being compatible with the other ingredients of the pharmaceutical composition. It must also be suitable for use in contact with the tissue or organ of humans and non-human animals without excessive toxicity, irritation, allergic response, immunogenicity or other problems or complications commensurate with a reasonable benefit/risk ratio. Examples of suitable pharmaceutically acceptable excipients are lubricants, cryoprotectants and the like. Except insofar as any conventional excipient medium is incompatible with a substance or its derivatives, such as by producing any undesirable biological effect or otherwise interacting in a deleterious manner with any other component(s) of the pharmaceutical composition, its use is contemplated to be within the scope of this invention.

In a final aspect the present invention provides an in vitro method for determining the presence of an analyte in a sample.

In the present invention, the expression "determining the presence" is to be understood as encompassing also de quantification of the analyte.

Enzymatic substrates suitable to perform the method of the invention, based on the catalytic activity of the conjugate, are well-known in the state of the art. Hence, illustrative non-limitative examples of substrates suitable in a peroxidase-based test are chromogenic soluble substrates, such as 3,3',5,5'-Tetramethylbenzidine (TMB), 2,2'-Azino-bis [3-ethylbenzothiazoline-6-sulfonic acid]-diammonium salt (ABTS), o-phenylenediamine dihydrochloride (OPD); chromogenic precipitating substrates such as Chloronaphthol (CN), 3-amino-9-ethylcarbazole (AEC), 3,3-diaminobenzidine (DAB); fluorogenic such as Acetyl-3,7-dihydroxyphenoxazine (ADHP); chemiluminescent such as luminol, among others. Illustrative non-limitative examples of enzymatic substrates suitable to perform a photocatalytic-based test are fluorogenic substrates such as Amplex Red, methylene blue or 3-(4-hydroxyphenyl) propionic acid (HPPA).

The colour change or the light emission is recorded in a spectrometer. From the data obtained with the spectrometer, the skilled person can be determined the amount of analyte using, for example, calibration curves.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim and shall not be construed as limiting the scope of the claim. Furthermore, the present invention covers all possible combinations of particular and preferred embodiments described herein.

EXAMPLES

1. Chemicals and Materials

Cadmium nitrate ($CdNO_3$), sodium sulfide ($Na_2S$), silver nitrate ($AgNO_3$), potassium tetracholoroplatinate ($K_2PtCl_4$), BSA, polyclonal anti-BSA IgG (developed in rabbit), anti-prostate specific antigen IgG (anti-PSA IgG), 3,3',5,5'-tetramethylbenzidine, (TMB), TMB liquid substrate system for ELISA, Amplex Red, sodium borohydride ($NaBH_4$), phosphate buffer saline (pH 7.4) (PBS), sodium phosphate monobasic ($NaH_2PO_4$), tris(hydroxymethyl)aminomethane (TRIS), citric acid and TWEEN were supplied by Sigma-Aldrich. Polyclonal anti-BSA IgG (developed in chicken) was purchased from Abyntek. Horseradish-peroxidase (HRP) conjugation kit was obtained from Abcam. One μm diameter polyvinyl chloride microbeads decorated with Protein G (beadBALL-Protein G) were obtained from Chemicell. Hydrogen peroxide ($H_2O_2$) was supplied by Panreac.

2. Characterization 2.1. Optical Methods

Fluorescence and UV-visible spectra were performed on a Varioskan Flash microplate reader (Thermo Scientific). The system was controlled by Skanit Software 2.4.3. for Varioskan Flash.

2.2. Spectroscopy

Images were acquired in a transmission electron microscope (TEM) of type JEM-2100F [Model EM-20014, UHR, 200 kV] (JEOL, Japan) equipped with a digital camera of type F-216 (TVIPS, Germany) with the scanning transmission electron microscopy (STEM) mode.

For imaging under cryo conditions, each of the vitrified grids have to be cryo-transferred in a 626 DH cryo transfer holder (Gatan Inc.) and manually analyzed at liquid nitrogen temperature (−174° C.) JEM-2200FS/CR (JEOL Europe, Croissy-sur-Seine, France) transmission electron microscope (TEM). This microscope is equipped with a field emission gun (FEG) operated at 200 kV and an in-column Omega energy filter.

X-ray photoelectron spectroscopy (XPS) experiments were performed in a SPECS Sage HR 100 spectrometer with a non monochromatic X ray source (Magnesium Kα line of 1253.6 eV energy and 252 W), placed perpendicular to the analyzer axis and calibrated using the 3d5/2 line of Ag with a full width at half maximum (FWHM) of 1.1 eV. The selected resolution for the spectra was 15 eV of Pass Energy and 0.15 eV/step. All measurements were made in an ultra-high vacuum (UHV) chamber at a pressure around 8.10 mbar. An electron flood gun was used to neutralize for charging. Samples were deposited on carbon adhesive tabs and dried in a Desiccator Cabinet (Scienceware®) for 48 hours.

Circular dichroism (CD) spectra were measured using a JASCO J-815CD Spectrometer using a 1 mm path length quartz cuvette. All CD spectra were recorded with a bandwith of 1 nm at 1 nm increments and 10 s average time.

Matrix Assisted Laser Desorption/Ionization time-of-flight (MALDI-TOF) measurements were performed in a MALDI/TOF-TOF MS UltrafleXtreme III (Bruker) with Flex Control 3.3. software.

Energy-dispersive X-ray (EDX) elemental maps were obtained using a probe-corrected ThermoFisher Titan electron microscope equipped with a Super-X detector, operated at 300 kV. Elemental maps were acquired over the course of 40 min at 150 pA electron beam current and analyzed using Bruker Esprit software.

3. Synthetic Methods for Obtaining the NC-Antibody Conjugate of the Invention 3.1. Synthesis of CdS NC-Anti-BSA IgG For the synthesis of CdS NC-anti-BSA IgG, a solution of $CdNO_3$ (5 µL, 0.1M) was added to an anti-BSA antibody solution (200 µL, 5 mg/mL). The mixture was stirred for 15 minutes at room temperature. Then, $Na_2S$ (5 µL, 0.05 M) was added dropwise. Immediately fluorescent NC were detected.

3.2. Synthesis of Ag/Pt NC-Anti-BSA IgG

For the synthesis of Ag/Pt NC-anti-BSA IgG, first $AgNO_3$ (50 µL, 150 µM) and $K_2PtCl_4$ (120 µL, 125 µM) were added to an anti-BSA antibody solution (100 µL of 1 mg/mL) in phosphate buffer (10 mM, pH 7.0). The mixture was incubated for 30 minutes in the dark. Then, a freshly prepared solution of $NaBH_4$ (30 µL, 5 mM) was added under vigorous stirring for initiating the reduction of the metal ions, until the colour of the mixture changed from colourless to pale brown. The mixture was allowed to react for three hours at room temperature.

After the reaction time both reaction mixtures were filtrated (15 minutes, 10000 g) using a 0.5 mL Amicon with a molecular weight cut-off of 30 kDa. The filtration was performed to separate the free ions from the ions forming NC.

3.3. Synthesis of Au/Pt NC-IgG

First $HAuCl_4$ (50 µL, 250 µM) and $K_2PtCl_4$ (120 µL, 500 µM) were added to a polyclonal anti-BSA antibody from rabbit solution (100 µL of 1 mg/mL) in phosphate buffer (10 mM, pH 7.0). The mixture was incubated for 30 minutes in the dark. Then, a freshly prepared solution of $NaBH_4$ (30 µL, 10 mM) was added under vigorous stirring for initiating the reduction of the metal ions, until the colour of the mixture changed from colourless to pale brown. The mixture was allowed to react for three hours at room temperature.

Alternatively, when the anti-PSA IgG was used, the protocol followed was the same as explained above but changing the IgG concentration to 0.5 mg/mL.

After the reaction time the mixture was filtrated (15 minutes, 10000 g) using a 0.5 mL Amicon with a molecular weight cut-off of 30 kDa. The filtration was performed to separate the free ions from the atoms forming NCs as well as the residual reducing agent remaining in the solution.

Control synthesis of both methods were carried out using BSA as scaffold instead of anti-BSA antibody, CdS NC-BSA, Ag/Pt NC-BSA and Au/Pt NC-BSA were produced. In this case instead of adding Anti-BSA IgG (100 µL of 1 mg/mL) a solution of BSA (100 µL of 1 mg/mL) in phosphate buffer (10 mM, pH 7.0) was added.

4. Labelling of Anti-BSA IgG with Horseradish Peroxidase (HRP)

A kit purchased from Abcam was used for the labelling of anti-BSA IgG (from rabbit) with HRP. Anti-BSA IgG (100 µL, 4 mg/mL) was mixed with the modifier reagent (10 µL). Then, this solution was added directly onto the lyophilized HRP and resuspended. The reaction mixture was allowed to react for 3 hours. After incubating, the quencher reagent (10 µL) was added. The conjugate did not require further purification and could be used after 30 minutes.

5. Preparation of Samples for Cryogenic Electron Microscopy (cryo-EM), STEM, X-Ray Photoelectron Spectroscopy (XPS) and MALDI-TOF STEM samples were immediately prepared from the solution of the freshly prepared sample by desiccating a tiny droplet of the solution on the hydrophilized surface of an ultrathin carbon film coated Cu-grid.

For the preparation of the vitrified grids for cryo-electron microscopy (cryo-EM) experiment was as follow. A freshly glow-discharged 300-mesh only-carbon coated grid was sited inside the chamber of a Vitrobot Mark II (FEI Company, USA), which was maintained at 8° C. temperature and with a relative humidity close to saturation to prevent drying artefacts in the blotting process. Four microliters of sample solution were absorbed onto the grid for 30 seconds. After most of the liquid in the grid was removed by blotting with absorbent standard filter paper to create an ultra-thin liquid film (typically bellow 100 nm film thickness). After the blotting step the grid was abruptly plunged into the liquid ethane bath, previously cooled with liquid nitrogen at approximately −180° C. Once the specimen was frozen, the vitrified grids were removed from the plunger and stored under liquid nitrogen. XPS samples were prepared by depositing 200 µL of the solution on carbon adhesive tabs and dried in a Desiccator Cabinet (Scienceware®) for 48 hours.

For the MALDI-TOF characterization the thin layer method as approach for sample deposition and a mixture of two matrixes was used (Signor L. et al., 2013). For the thin layer, a saturated solution of α-cyano-4-hydroxycinnamic acid (α-CHCA) in acetone (ACN) was prepared. A 10 µL pipette tip was dipped in the solution, then the standard MALDI metallic plate was touched by the pipette tip and deposit the α-CHCA solution. The matrix was composed by a mixture 1:1 ratio (vol/vol) of 20 mg/mL of α-CHCA in ACN and 5% formic acid (70:30, vol/vol) and a 20 mg/mL of 2,6-dihydroxybenzoic acid (DHB) in ACN and 0.1% TFA (70:30, vol/vol). Finally, 0.5 µL of the sample was mixed with 0.5 µL of the mixture of matrix solution and deposited on the thin layer previously deposited in the standard MALDI metallic plate.

6. Preparation of Polyvinyl Chloride Microbeads Decorated with Protein G/NC-IgG Composites Microbeads decorated with protein G (600 µL, 10 mg $mL^{-1}$) were added into a 1.5 mL microcentrifuge tube and centrifuged (500 g, 1 min). The supernatant was discarded, and the beads were washed with PBS (600 µL, pH 7.4) three times and resuspended in PBS (600 µL).

100 µL of the beads were added to six different tubes. CdS NC-anti-BSA IgG (100 µL, 5 mg/mL) (referred to Anti-BSA IgG concentration), Ag/Pt NC-anti-BSA IgG (100 µL, 0.33 mg/mL) (referred to Anti-BSA IgG concentration), Au/Pt NC-anti-BSA IgG (100 μL, 0.33 mg/mL), CdS NC-BSA (100 μL, 5 mg/mL) (referred to BSA concentration), Ag/Pt NC-BSA (100 μL of 0.33 mg/mL) (referred to BSA concentration) and Au/Pt NC-BSA (100 μL of 0.33 mg/mL) (referred to BSA concentration) were added to each tube respectively. After 15 minutes incubation at room temperature (RT) under stirring the beads were washed three times with PBS/0.05% (v/v) Tween (PBST) and resuspended in 100 μL of PBS.

7. Activity Evaluation of the Conjugates of the Invention (to Confirm the Functionality of the NC Within the Antibody)

The assays were carried out at room temperature in a 96-well NUNC Microwell plate.

The photocatalytic activity of the CdS NC-anti-BSA IgG was quantified by photooxidation of the commercially available fluorogenic substrate Amplex Red. The system was composed of TRIS buffer (5 mM, pH=8.0) containing CdS NC-anti-BSA IgG and Amplex Red (0.4 mM). The fluorescence spectra were recorded after incubation under a 365 nm wavelength UV lamp, using an excitation and emission wavelength of 530 nm and 590 nm respectively.

The catalytic activity of Ag/Pt NC-anti-BSA IgG and Au/Pt NC-IgG was evaluated using the chromogenic substrate 3,3',5,5'-Tetramethylbenzidine (TMB). The system was composed of 100 μL of acetate buffer (10 mM, pH=4.0) containing either Ag/Pt NC-anti-BSA IgG or Au/Pt NC-IgG, TMB and $H_2O_2$. The colour change of the substrate from colourless to blue was monitored along the time at an absorption wavelength of 652 nm.

8. Direct ELISA with the Conjugates of the Invention

The immunoassays were carried out in a 96-well plate Nunc MaxiSorp.

First, different BSA concentrations (100 μL) in PBS were added into the wells and incubated (overnight (ON), 4° C.). Then, a solution of casein (100 μL, 20.5 mg/mL) was added as a blocking agent and incubated (1 h, room temperature (RT)). CdS NC-anti-BSA IgG (100 μL, 500 μg/mL), Ag/Pt NC-anti-BSA IgG (100 μL, 33 μg/mL) or Au/Pt NC Anti-BSA IgG (100 μL, 33 μg/mL) was added and incubated (1 h, RT).

In order to confirm how specific was the antibody forming part of the conjugate of the invention towards its antigen, the catalytic activity was determined as explained above. Thus, Amplex Red (100 μL, 0.4 mM) was added in order to determine the photocatalytic activity of CdS NC-anti-BSA IgG; or, alternatively 100 μL of TMB (200 μM) and $H_2O_2$ (125 mM) were added in order to determine the catalytic activity of Ag/Pt NC-anti-BSA IgG with 100 μL of TMB (200 μM) and $H_2O_2$ (125 mM); or, alternatively, 100 μL of TMB (200 μM) and $H_2O_2$ (250 mM) were added in order to determine the corresponding catalytic activity of Au/Pt NCs-IgG.

After each step of the protocol provided herein the wells were washed three times with phosphate buffered saline with Tween 20 (PBST) (100 μL). The activity measured is directly proportional to the amount of conjugate (through the anti-BSA IgG) specifically bound to the antigen (i.e., BSA) present on well's surface.

For the case of Au/Pt NC-anti-PSA IgG, the surface of a MaxiSorp microplate was cover with different concentrations of PSA and incubated (ON, 4° C.). Then, casein (100 μL, 20.5 mg/mL) was added as blocking agent and incubated (1 h, RT). After, Au/Pt NCs Anti-PSA IgG (100 μL, 16 μg/mL) were added and incubated (1 h, RT). Finally, the antigen concentration was related with the catalytic activity of Au/Pt NCs Anti-PSA IgG with 100 μL of TMB (200 μM) and $H_2O_2$ (250 mM). After each step the wells were washed three times with PBST (100 μL).

9. Direct Sandwich ELISA using the Conjugate of the Invention

The immunoassay was carried out in a 96-well plate Nunc MaxiSorp. Capture antibody from chicken (100 μL, 10 μg/mL) was immobilised on the surface of microplate (2 hours, 37° C.). Next the surface was blocked with casein (100 μL, 20.5 mg/mL) and incubated (ON, 4° C.). The target analyte was added in different wells and incubated (1 h, RT). Upon incubation Ag/Pt NC-anti-BSA IgG or Au/Pt NC-anti-BSA IgG (from rabbit) was added and incubated (1 h, RT). 100 μL of TMB (200 μM) and $H_2O_2$ solution (125 mM when Ag/Pt NC-IgG, 250 mM when Au/Pt NC-anti-BSA IgG) were added to the microplate and incubated for 4 minutes. Then the absorbance of the oxidised TMB was measured on the standard plate reader. The intensity of the absorbance of the oxidised TMB at 652 nm was measured on the standard plate reader for 4 minutes in every case (Antibodies modified with Ag/Pt NCs and Au/Pt NCs) in order to calculate the initial reaction rate. After each step the wells were washed three times with PBST (100 μL).

10. Direct Sandwich ELISA using an anti-BSA IgG/HRP (Comparative Purposes)

The immunoassay was carried out in a 96-well plate Nunc MaxiSorp. Capture antibody from chicken (100 μL, 10 μg/mL) was immobilised on the surface of microplate (2 hours, 37° C.) next the surface was blocked with casein (100 μL, 20.5 mg/mL) and incubated (ON, 4° C.). The target analyte was added in different wells and incubated (1 h, RT). 100 μL of antibody for BSA (from rabbit) labelled with HRP (using the kit of Abcam for the labelling of antibodies with HRP) was added and incubated (1 hour, RT). Finally, 100 μL of TMB liquid substrate system for ELISA was added. Then the absorbance of the oxidised TMB was measured on the standard plate reader. After each step the wells were washed three times with PBST (100 μL).

Results

Characterization of CdS NC-Anti-BSA IgG, Ag/Pt NC-anti-BSA IgG and Au/Pt NC-Anti-BSA IgG a) Size, Morphology and Composition.

The prepared CdS and Ag/Pt NC-antiBSA IgG were characterized by Cryo-TEM, where the size and the morphology of the CdS and Ag/Pt cores were shown clearly. The images revealed that both types of NC have a spherical morphology. Based on the statistics over 100 individual particles, the mean diameter of the CdS NC inside of Anti-BSA IgG was 1.74±0.30 nm. They had similar diameter as Ag/Pt NC-anti-BSA IgG 1.83±0.30 nm.

The prepared Au/Pt NC-anti-BSA IgG and Au/Pt NC-anti-PSA IgG were characterised by STEM, where the size and the morphology of the Au/Pt cores were clearly shown. The image revealed that the NCs exhibit a spherical morphology ( ) Based on the statistics over 100 individual particles, the mean diameter of the Au/Pt NC in the case of the Au/Pt NC anti-BSA IgG conjugate was 1.97±0.71 nm, and in the case of the Au/Pt NC-anti-PSA IgG the mean diameter was 1.51±0.78 nm.

Fluorescent properties of CdS NC-anti-BSA IgG were evaluated after filtration. The fluorescence emission could be easily seen by the naked eye under UV light and recorded by digital camera. The maximum emission was observed at an excitation wavelength of 315 nm.

EDX measurements were used to determine the elemental composition of a single NC. The EDX mapping for Au/Pt NC-anti-BSA IgG shows that a single NC contains both metals. The atomic percentage for Au and Pt is 9 an 91% respectively.

XPS method was used to determine the ratios of metals in different oxidation states. The XPS analysis for CdS NC-anti-BSA IgG reveals the presence of Cd 3d peaks at 405.8 eV for CdS bond.

In Ag/Pt NC anti-BSA IgG the XPS analysis revealed the presence of the peak Pt 4f7/2 for Pt 0 and Pt II at 70.1 and 71.7 eV respectively and for Ag 3d5/2 at 368.3 Ev. The peak 3d5/2 was generally found at 368 eV for Ag 0. In this case the peak was slightly shifted to higher binding energies. In the Pt 4f7/2 spectrum, a broad peak was found. It was fitted by an asymmetric Lorentzian curves in the case of Pt 0, while Pt II with a symmetric Gaussian-Lorentzian curve. Two possible oxidation state of platinum were recognized: Pt 0 and Pt II. The peaks 4f7/2 are found to 71 eV and 72.4 eV respectively. In this case they were slightly shifted to lower binding energies. The ratio between Pt 0/Pt II was 1.1.

The XPS analysis for Au/Pt NC-anti-BSA IgG showed characteristic doublet with the 4f7/2 and 4f5/2 spaced 3.67 eV in Au 4f region. The main peak was attributed to Au (0) and it is usually found at 84 eV. Au(I) is generally found at 85 eV. The ratio between different oxidation states (Au(0)/Au(I)) was 2.33. The shift to lower BE might be attributed to the interaction with Pt. In the Pt 4f spectrum two possible oxidation states of Platinum were recognized: Pt 0 and Pt II. In literature the peaks 4f 7/2 are found to 71 eV and 72.4 eV respectively. The ratio between oxidation states Pt (0)/Pt(II) was 1.44. A small shoulder due to Pt (IV) can be observed and it corresponds to the 4f5/2. 4f7/2 is found around 74.9 eV.

In the case of the Au/Pt NC-anti-PSA IgG, the XPS analysis revealed peaks characteristics for gold and platinum. The ratio between different oxidation states was 2.35 Au (0)/Au (I) and 1.94 for Pt (0)/Pt(II).

b) Only One NC Forming Part of the Conjugate of the Invention

According to TEM images, NCs grown inside of antibodies were separated by distances greater than 10-15 nm (size of one IgG), which means that the NC is attached per one IgG otherwise aggregation of several NCs within the distance of 14 nm could be seen on TEM images.

c) The NC is Attached to the Antibody

The MALDI-TOF measurements were carried out in order to make sure that the metallic nanocluster is bound to the IgG. In FIG. 1 mass spectra (m/z$^+$, z=2) for Anti-BSA IgG, CdS NC-anti-BSA IgG, Ag/Pt NC-anti-BSA IgG and Au/Pt NC-anti-BSA IgG is showed. A shift in the spectra towards higher masses appeared in NCs, in comparison with the spectrum of the unmodified anti-BSA IgG (FIG. 1). This result indicates that the metallic NC is bound to the anti-BSA IgG.

Conformation of the Antibody Forming Part of the Conjugate of the Invention a) The Introduction of Metallic and Semiconductor Nanoclusters into the IgG Structure Does Not Cause Any Significant Alteration in the IgG Conformation CD spectroscopy can be used for characterization of the secondary structure of a protein and also to detect changes in its conformation. Far-UV CD spectra (180-250 nm) are related with the secondary structure of proteins, the predominant secondary structure for IgG are the antiparallel δ-sheet and random coil conformations. It is well-established that a broad minimum at 218 nm in the far-UV CD spectra is indicative of a significant presence of β-sheets.

Figure 2:
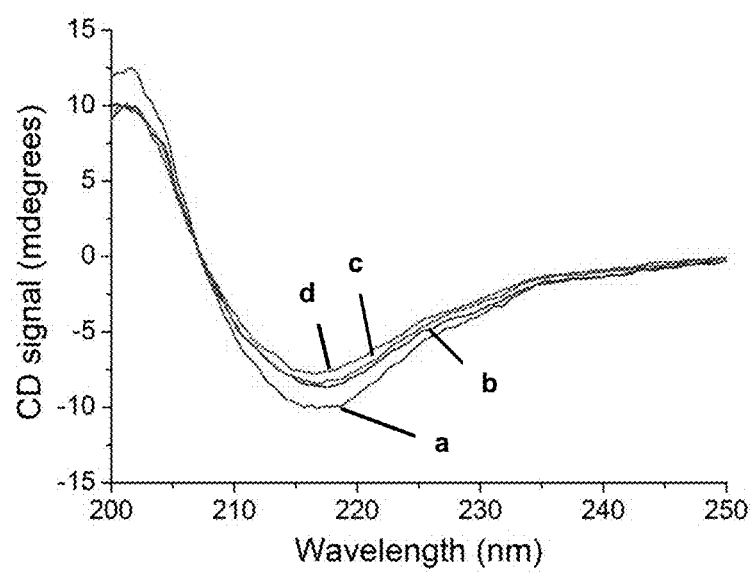
FIG. 2: Far-UV CD spectra of anti-BSA IgG (curve a), CdS NC-anti-BSA IgG (curve b), Ag/Pt NC-anti-BSA IgG (curve c), and Au/Pt NC-anti-BSA IgG (curve d).

The introduction of metallic nanoclusters in the structure of the anti-BSA IgG could change the conformation of the IgG and the affinity for its antigen could be reduced or completely disappear. CD spectra of the anti-BSA IgG, CdS NC-anti-BSA IgG, Ag/Pt NC-anti-BSA IgG and Au/Pt NC-anti-BSA IgG (FIG. 2) showed the β-sheet conformation for the anti-BSA IgG.

No change in spectra was found for CdS NC-anti-BSA IgG, Ag/Pt NC-anti-BSA IgG and Au/Pt-anti-BSA IgG.

Therefore, the introduction of metallic and semiconductor nanoclusters into the IgG structure does not cause any significant alteration in the IgG conformation and, hence, in its functionality.

b) Fc Structure of the IgG was Not Changed during the Synthesis of the Conjugate of the Invention The affinity of the Fc region of IgG produced in rabbit for Protein G was also used to check if the attachment of one NC per antibody caused any damage to the structure of the Fc region. The Fc region of an IgG binds specifically to protein G. Polyvinyl Chloride Microbeads decorated with Protein G were incubated with the antibodies carrying semiconductor and bimetallic NC as described in the previous experimental sections 3.1. to 3.3.

NC of CdS, Ag/Pt and Au/Pt produced using BSA as scaffold were synthesized in order to be used as controls. BSA does not have any affinity for Protein G, therefore no binding to the protein G should be detected.

The CdS NC stabilized using BSA is fluorescent. BSA carrying the Ag/Pt NC and Au/Pt NC synthesized as explained above, showed catalytic properties with respect to oxidation of TMB in presence of $H_2O_2$. The fluorescent properties of the CdS NC-anti-BSA IgG and CdS NC-BSA and the catalytic properties of Ag/Pt NC-anti-BSA IgG, Ag/Pt NC-BSA, Au/Pt NC anti-BSA IgG, Au/Pt NC-BSA were used to verify that the IgG modified with NC binds specifically to Protein G microbeads. While the experiment carried out using BSA carrying CdS, Ag/Pt and Au/Pt NC was performed to probe that microbeads decorated with protein G became fluorescent or catalytic not due to non-specific adsorption on the surface but due to the specific interaction of protein G with the Fc region of the antibody carrying NC and this affinity was not significantly affected by the presence of NCs attached to antibodies. This allows to conclude that (a) conjugates became fluorescent or catalytic not due to non-specific adsorption on the surfaces but due to the specific interaction of protein G with the Fc region of the antibody carrying NCs, and (b) this affinity was not significantly affected by the presence of NCs attached to antibodies.

Figure 3:
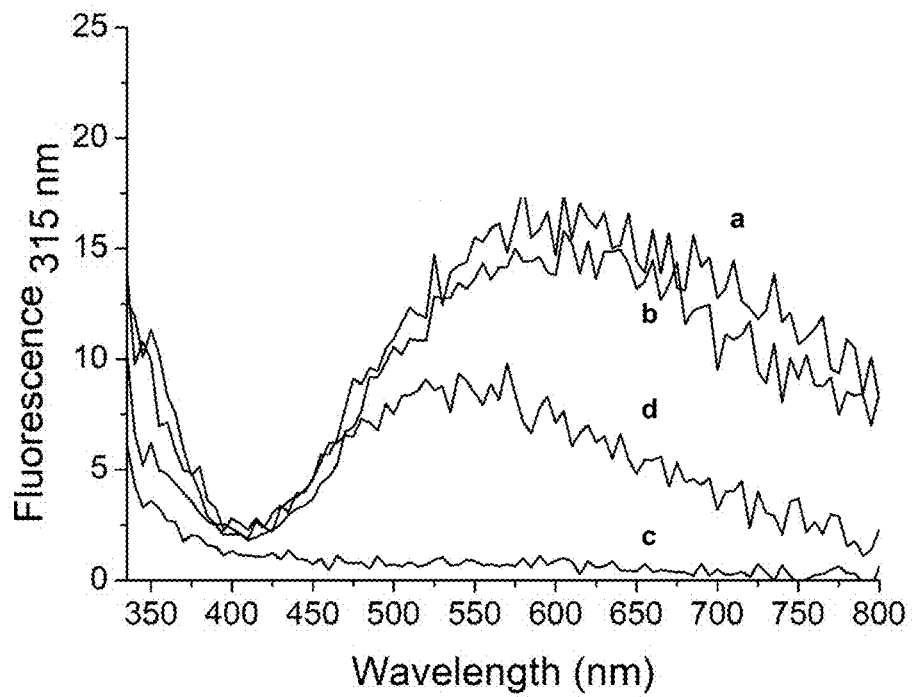
FIG. 3: Fluorescence spectrum ($\lambda ex=315$ nm) of CdS NC-anti-BSA IgG (curve a), CdS NC-IgG incubated with microbeads decorated with Protein G (curve b), CdS NC-BSA incubated with microbeads decorated with Protein G (curve c), and CdS NCs BSA (curve d).

The fluorescence spectra of the CdS NC-IgG and CdS NC-BSA incubated with the microbeads was measured using an excitation wavelength of 315 nm. Also, the fluorescence of CdS NC-IgG and CdS NC-BSA in solution without microbeads was measured. The fluorescent spectra are showed in FIG. 3.

The spectrum of CdS NC-IgG in solution (curve a) is practically the same as the spectrum obtained after washing pre-incubated CdS NC-IgG Protein G microbeads (curve b). When BSA carrying CdS NC was incubated with Protein G microbeads, practically no fluorescence was observed after washing (curve c). Taking into consideration that BSA carrying CdS NC show good fluorescence in solution (curve d) the inventors concluded that fluorescence shown by Protein G microbeads modified with CdS NC-IgG was attributed to specific binding of CdS NC-IgG to protein G and that, for that reason, Fc region of anti-BSA IgG could not be altered due to the inclusion of the semiconductor NC.

Figure 4:
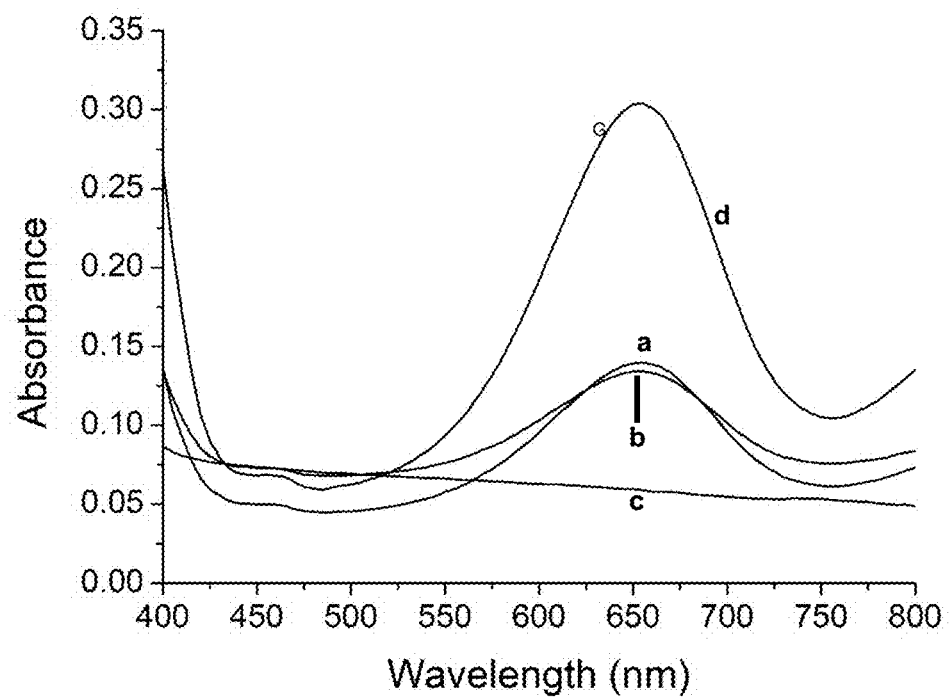
FIG. 4: Absorbance spectrum for different wavelengths when Ag/Pt NC-anti-BSA IgG (curve b), Ag/Pt NC-BSA (curve d), and Ag/Pt NC-anti-BSA IgG (curve a) and Ag/Pt NC-BSA (curve c) incubated with TMB in presence of $H_2O_2$ and microbeads decorated with Protein G and free in solution.
Figure 5:
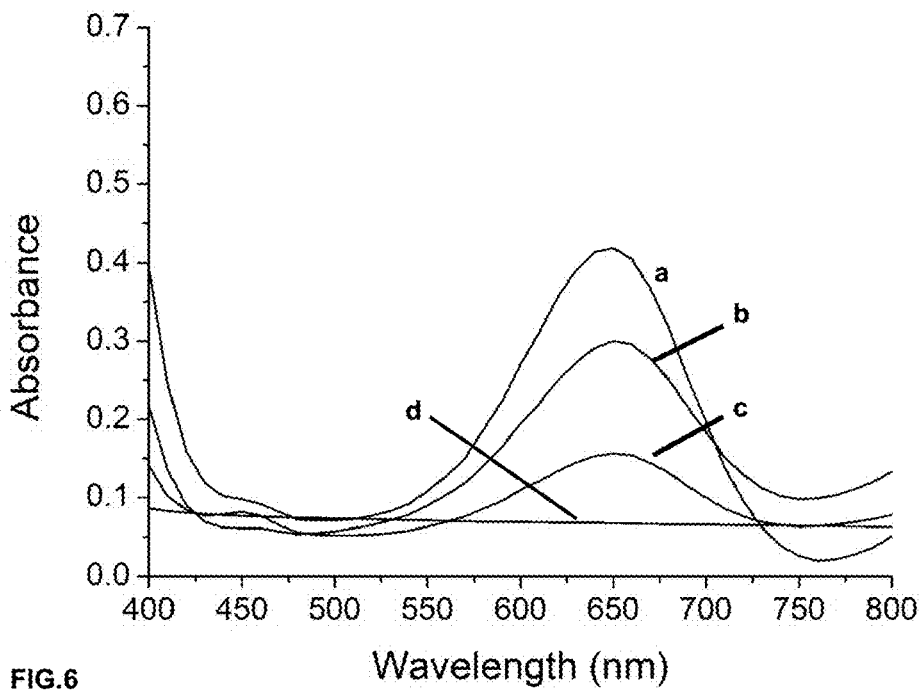
FIG. 5: Absorbance spectrum for different wavelengths for: Au/Pt NC-IgG (curve a), Au/Pt NC-BSA (curve c), and Au/Pt NC-IgG (curve b), Au/Pt NC-BSA (curve d) when incubated with TMB in presence of $H_2O_2$ incubated and microbeads decorated with Protein G and free in solution.

The catalytic activity with TMB in the presence of $H_2O_2$ was used to probe the binding of Ag/Pt NC-anti-BSA IgG and Ag/Pt NC-BSA, and of Au/Pt NC-anti-BSA IgG and Au/Pt NC-BSA to Protein G microbeads. The microbeads were incubated with Ag/Pt NC-anti-BSA IgG, Ag/Pt NC-BSA, Au/Pt NC-anti-BSA IgG or Au/Pt NC-BSA. The supernatant was discarded and microbeads were washed by centrifuging three times. Next, 100 µL of a solution of TMB (200 µM) and $H_2O_2$ (125 mM for Ag/Pt NC and 250 mM for Au/Pt NC) in acetate buffer (10 mM, pH=4.0) was added to pellets. The activity of free Ag/Pt NC-anti-BSA IgG, Ag/Pt NC-BSA, Au/Pt NCs-anti-BSA IgG and Au/Pt NCs-BSA in solution was determined by the addition of the same solution of TMB and $H_2O_2$. In FIG. 4 and FIG. 5 the absorbance spectra are shown.

FIG. 4 shows that the catalytic activity of Ag/Pt NC-anti-BSA IgG in solution (a) is practically the same as that of the Ag/Pt NC-anti-BSA IgG incubated with Protein G microbeads (b). However, in the case of BSA no catalytic activity was shown by Ag/Pt NC-BSA incubated with Protein G microbeads (c). Free Ag/Pt NC-BSA in solution demonstrates catalytic activity (d). Analogously, FIG. 5 allows to arrive to the same conclusions when the Au/Pt NC-anti-BSA IgG was tested: the catalytic activity of Au/Pt NC-anti-BSA IgG is solution (a) is practically the same as the one obtained with Au/Pt NC-anti-BSA IgG incubated with protein G microbeads. And no catalytic activity was shown by Au/Pt NC-BSA incubated with microbeads.

These results indicate that the Fc structure of the IgG did not changed during the synthesis of CdS NC-IgG, Ag/Pt NC-anti-BSA IgG and Au/Pt NC-anti-BSA IgG because the IgG still had affinity for Protein G and also that the binding is due to its affinity and to non-specific interactions. These results also allow to conclude that the NC is not occupying the Fc region (if it was the case, the conjugate of the invention would not have been able to bind to G protein).

Photocatalytic Activity of CdS NC-IgG of the Invention

Figure 6:
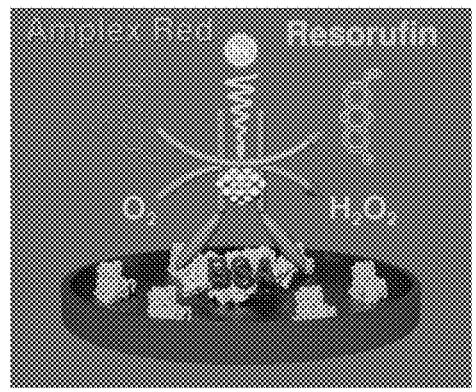
FIG. 6: (A) Direct immunoassay for BSA based on the photocatalytic properties of CdS NC-anti-BSA IgG. (B) Variation of the fluorescence of Amplex Red as a function of BSA concentration ($\lambda ex=530$ nm, $\lambda em=590$ nm). Three replicates were performed to obtain the readout signal.
Figure 6:
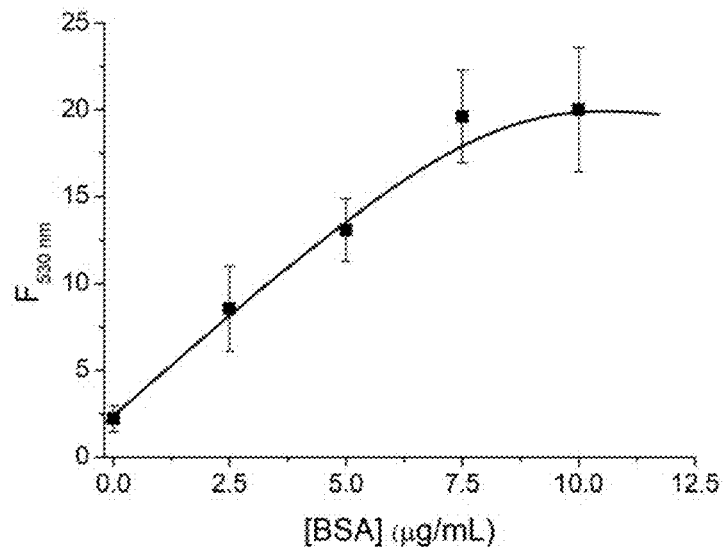

CdS NC-IgG were able to oxidise Amplex Red to resorufin under UV-light (FIG. 6(A)). The substrate changes from colourless and non-fluorescent to pink and fluorescent ($\lambda$ex=530 nm, $\lambda$em=590 nm). The colour change could be easily seen by the naked eye and recorded by digital camera. This photocatalytic property can be used in an immunoassay, relating the amount of antigen that binds the modified IgG with the Amplex Red oxidation.

Catalytic Activity of Ag/Pt NC-Anti-BSA IgG, Au/Pt NC-Anti-BSA IgG, and Au/Pt NC-Anti-PSA IgG of the Invention It was found that Ag/Pt NC-anti-BSA IgG, Au/Pt NC-anti-BSA IgG and Au/Pt NC-anti-PSA IgG had enzymatic peroxidase activity, like the commonly used enzyme HRP. These conjugates catalysed the oxidation of the chromogenic substrate TMB with $H_2O_2$ which changes its colour from colourless to blue ($\lambda$abs=652 nm). This catalytic activity can be used in an immunoassay to relate the amount of antigen that binds the modified IgG with the TMB oxidation.

Affinity of the Conjugate of the Invention Towards the Specific Antibody's Antigen Interaction of CdS NC-IgG, Ag/Pt NC-anti-BSA IgG and Au/Pt NC-anti-BSA IgG with BSA was studied with a direct immunoassay. FIG. 6(A) represents the method used to evaluate the binding of CdS NC-IgG with different amounts of BSA immobilized on the surface of plastic microplates obtained by incubation with varying concentrations of BSA (from 0 to 10 µg/mL) in buffered solutions. The higher was the amount of BSA adsorbed the greater photooxidation rate of Amplex Red to Resorufin was observed. The calibration curve shows FIG. 6(B)) that the fluorescence emission at $\lambda$em=590 nm ($\lambda$ex=530 nm) increases with BSA concentration. The fluorescence values were recorded after 30 minutes of incubation of aqueous solutions of Amplex Red, placed in microplates wells, under UV-light (365 nm).

Figure 7:
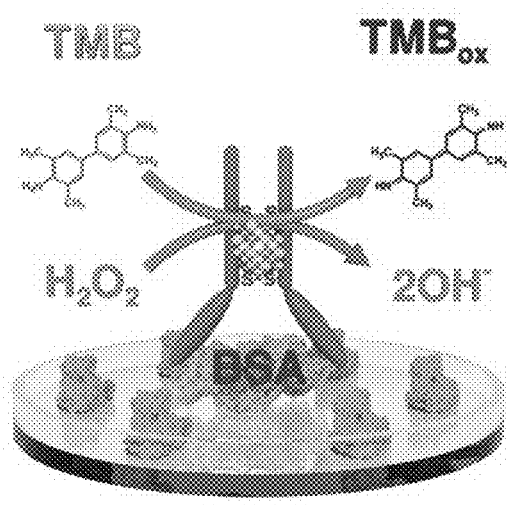
FIG. 7: (A) Direct immunoassay for BSA based on the catalytic properties of Ag/Pt NC-anti-BSA IgG. (B) Reaction rate of TMB oxidation as a function of BSA concentration using Ag/Pt NC-anti-BSA IgG as detection antibody ($\lambda abs=652$ nm). Three replicates were performed to obtain the readout signal.
Figure 7:
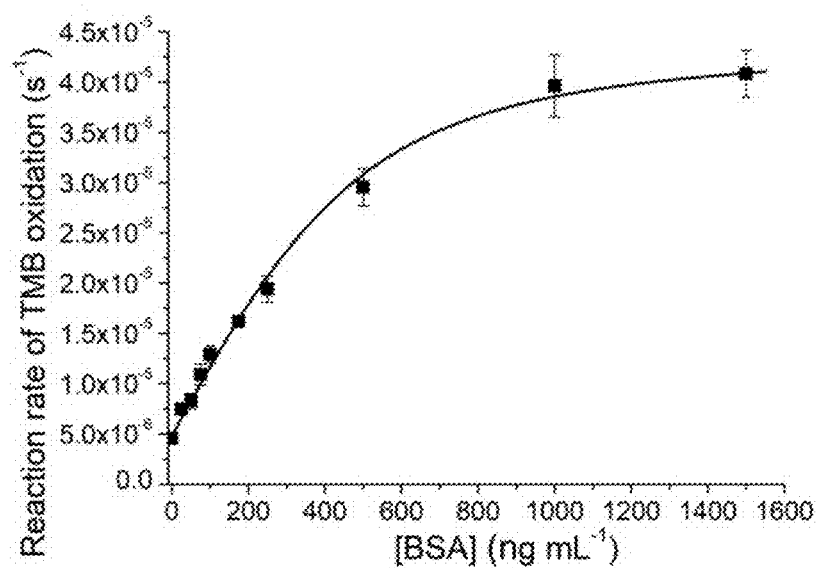

In FIG. 7(A) the scheme of the direct immunoassay based on the catalytic properties of Ag/Pt NC-anti-BSA IgG is showed. The amount of BSA adsorbed was controlled by incubation with solutions containing varying concentrations of BSA (0 to 1400 ng/mL). When the surface coverage of BSA immobilized on the microplate increased the oxidation rate of TMB increased proportionally measured by UV-Vis spectroscopy ($\lambda$abs=652 nm). The calibration curve shows (FIG. 7(B)) how the initial oxidation rate of TMB (measured for 4 minutes) increased with increasing BSA concentration.

Figure 8:
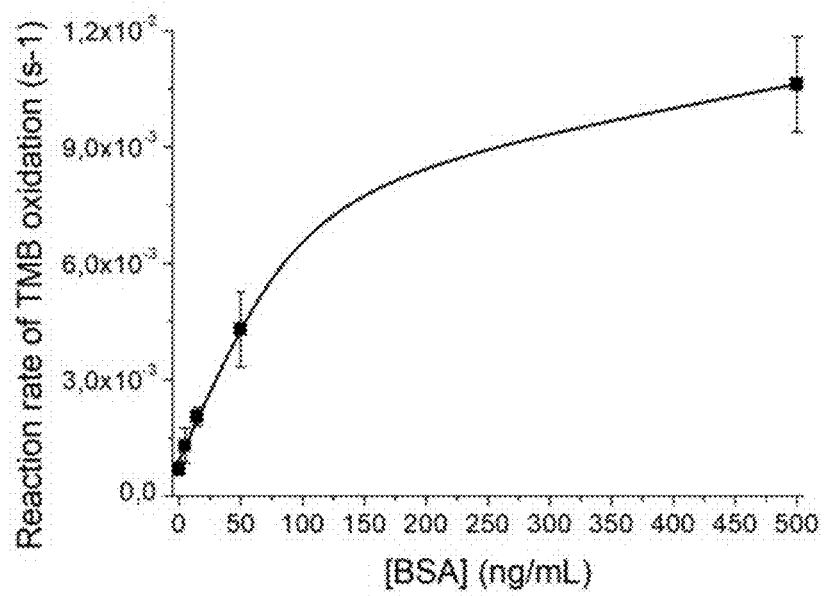
FIG. 8: Reaction rate of TMB oxidation as a function of BSA concentration using Au/Pt NC-anti-BSA IgG as detection antibody ($\lambda abs=652$ nm). Three replicates were performed to obtain the readout signal.

Interaction of Au/Pt NC-anti-BSA IgG with BSA was studied with a direct immunoassay. In FIG. 7(A) the scheme of the direct immunoassay based on the catalytic properties of Au/Pt NC-anti-BSA IgG is showed. The amount of BSA adsorbed was controlled by incubation with solutions containing varying concentrations of BSA (0 to 500 ng/mL). When the surface coverage of BSA immobilized on the microplate increased the oxidation rate of TMB increased proportionally measured by UV-Vis spectroscopy ($\lambda$abs=652 nm). The calibration curve shows (FIG. 8) how the initial oxidation rate of TMB (measured for 4 minutes) increased with increasing BSA concentration.

Figure 9:
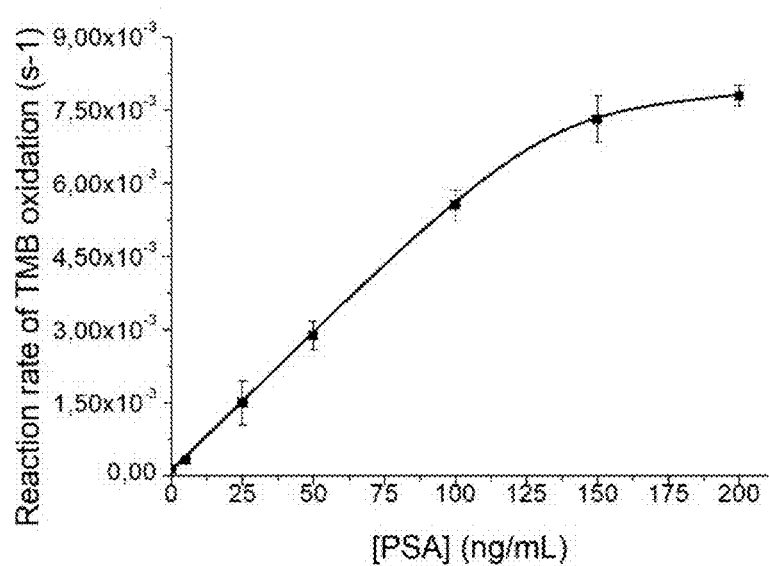
FIG. 9: Reaction rate of TMB oxidation as a function of PSA concentration using Au/Pt NC-anti-PSA IgG as detection antibody (λabs=652 nm). Three replicates were performed to obtain the readout signal.

Interaction of Au/Pt NC-anti-PSA IgG with PSA was studied with a direct immunoassay. In FIG. 7(A) the scheme of the direct immunoassay based on the catalytic properties of Au/Pt NCs-anti-PSA IgG is showed. The amount of PSA adsorbed was controlled by incubation with solutions containing varying concentrations of PSA (0 to 200 ng/mL). When the surface coverage of PSA immobilized on the microplate increased the oxidation rate of TMB increased proportionally measured by UV-Vis spectroscopy ($\lambda_{abs}$=652 nm). The calibration curve shows (FIG. 9) how the initial oxidation rate of TMB (measured for 4 minutes) increased with increasing PSA concentration.

Altogether, from these data it could be concluded that the antibody forming part of the invention not only was in a native conformation, but also that, even housing the NC, was functional, dose-responding and sensitive to the amount antigen. This is indicative of the value of the conjugate of the invention in immunoassay tests.

First, we probe that antibody modified with NCs show affinity to Protein G on the surface of microbeads. Second, we found out these antibodies demonstrate affinity to the target analyte. It means that the NCs are located in the middle of antibodies most probably in the area where the heavy chains are joined by disulfide bonds Optimisation of Detection Antibody Concentration for Direct Sandwich ELISA A) Based on the Conjugate IgG-HRP (Comparative Purpose)

Capture antibodies for BSA were passively attached to the solid phase of a microplate and the surface was blocked with casein to prevent non-specific adsorption. Next, after incubation with BSA (0 and 200 ng/mL), antibody for BSA (from rabbit) labelled with HRP, which is the standard enzymatic label employed broadly in ELISA, was incubated. Finally, TMB was added and the absorption of the oxidised TMB was measured for 4 minutes in the standard plate reader.

Figure 10:
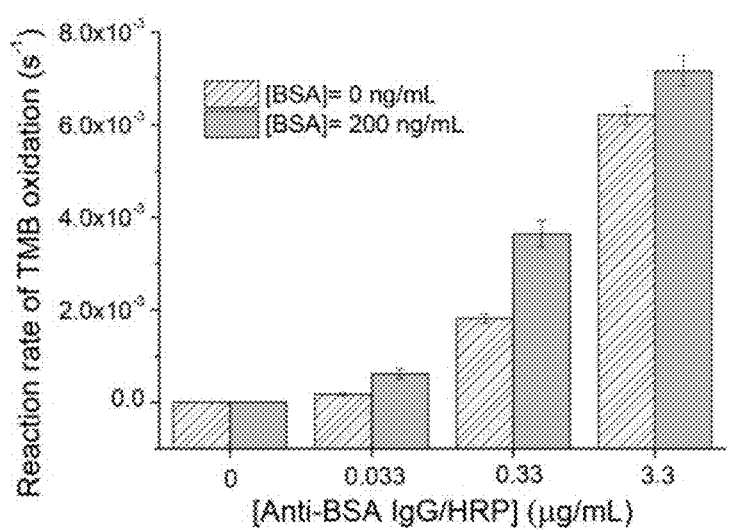
FIG. 10: (A) Reaction rate of TMB oxidation in the direct sandwich ELISA performed with Anti-BSA IgG/HRP with and without target analyte. (B) The ratio of readout signals measured in microplate wells with and without the target analyte (BSA).
Figure 10:
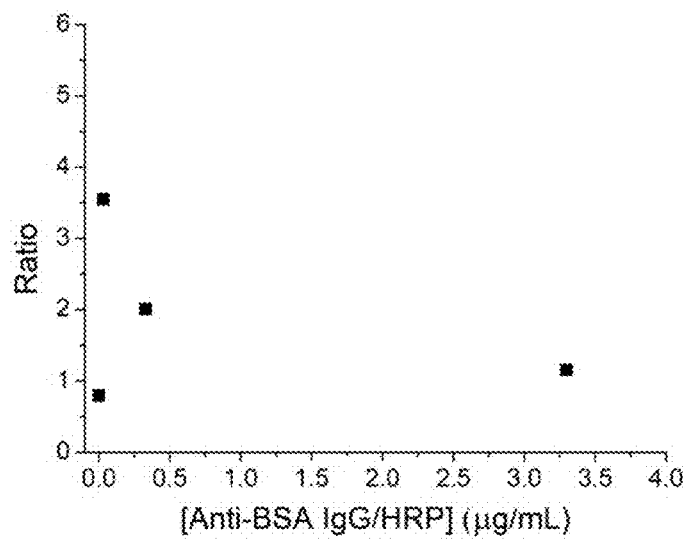

We optimised the concentration of detection antibody labelled with HRP by performing experiments using varying concentration of this conjugate. To prepare this conjugate a commercially available kit purchased from Abcam was employed, as mentioned on experimental section. The optimisation of HRP-antibody conjugate was done in order to decrease its non-specific adsorption and to obtain the highest ratio of read out signals obtained in the presence and the absence of analyte. In FIG. 10(A) the reaction rate of TMB oxidation was represented for the assays with and without target analyte for each anti-BSA IgG concentration. The best ratio between two readout signals (3.55) was obtained when the concentration of detection antibody/HRP conjugated was 0.033 µg/mL as one can see in FIG. 10(B).

B) Based on the Conjugate Ag/Pt NC-Anti-BSA IgG of the Invention

Capture antibody from chicken was immobilised on the surface of microplate and the surface of the well was blocked with casein. Then the target analyte (0 and 200 ng/mL) was added in different microplates wells. Then Ag/Pt NC-anti-BSA IgG (from rabbit) was added. TMB solution was added to the microplate and the increase of the oxidation rate of TMB was measured for 4 minutes on the standard plate reader.

Figure 11:
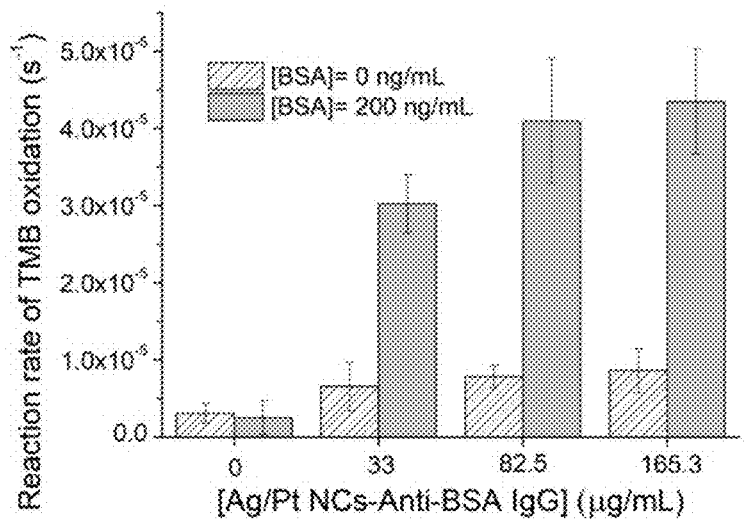
FIG. 11: (A) Reaction rate of TMB oxidation in the direct sandwich ELISA using Ag/Pt NC-anti-BSA IgG as the primary antibody. (B) The ratio of readout signals measured in microplate wells with and without the target analyte (BSA).
Figure 11:
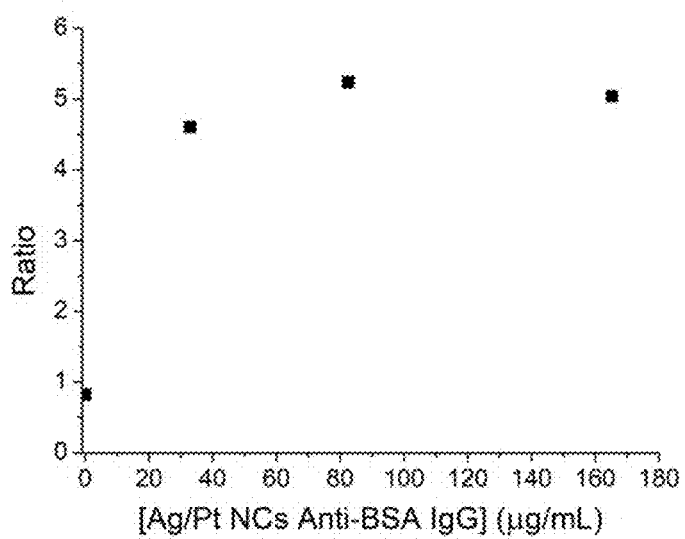

In order to optimise the assay varying concentrations of Ag/Pt NC-anti-BSA IgG were added. In FIG. 11 (A) the initial rate of TMB oxidation was calculated for the assays with and without the target analyte for each Ag/Pt NC-anti-BSA IgG concentration. The highest ratio between two signals observed with and without the target analyte was 5.23 (FIG. 11 (B)).

C) Based on the Conjugate Au/Pt NC-Anti-BSA IgG of the Invention

Capture antibody from chicken was immobilised on the surface of microplate and the surface of the well was blocked with casein. Then the target analyte (0 and 200 ng/mL) was added in different microplates wells. Then Au/Pt NC-anti-BSA IgG (from rabbit) was added. TMB solution was added to the microplate and the increase of the oxidation rate of TMB was measured for 4 minutes on the standard plate reader.

Figure 12:
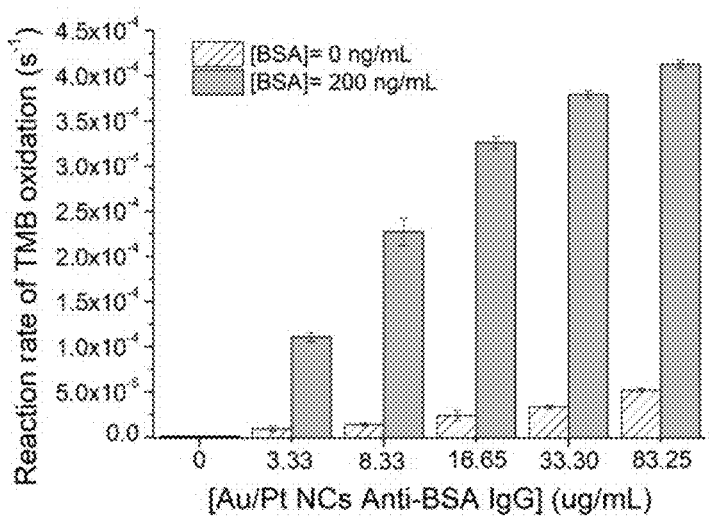
FIG. 12: (A) Reaction rate of TMB oxidation in the direct sandwich ELISA using Au/Pt NCs Anti-BSA IgG as the primary antibody. (B) The ratio of readout signals measured in microplate wells with and without the target analyte (BSA).
Figure 12:
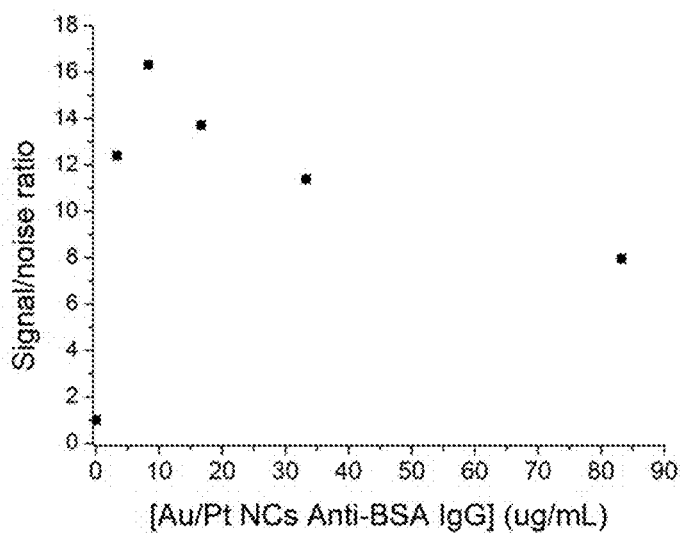

In order to optimise the assay varying concentrations of Au/Pt NC-anti-BSA IgG were added. In FIG. 12(A) the initial rate of TMB oxidation was calculated for the assays with and without the target analyte for each Au/Pt NC-anti-BSA IgG concentration. The highest ratio between two signals observed with and without the target analyte was 16.3 (FIG. 12(B)).

This assay based on Au/Pt NC-anti-BSA IgG showed the highest signal to noise ratio.

In the assays based on different modified detection antibodies capture and initial detection antibodies were the same, a polyclonal IgG from chicken for the capture antibody and a polyclonal IgG from rabbit for the detection antibody. This means that the comparison between three different assays was performed under the most similar conditions. In order to perform the direct sandwich assay based on Anti-BSA IgG/HRP conjugate the commercially available kit from Abcam specifically designed and optimised for conjugation of antibodies with HRP was employed to produce Anti-BSA IgG/HRP conjugate.

The assay based on "Abcam modified" antibodies showed the worst signal noise ratio in comparison with that of our assay employing Ag/Pt NC-anti-BSA IgG and Au/Pt NC-anti-BSA IgG.

D) Limit of Detection

The inventors performed a direct sandwich ELISA test in three assays, each one based on one of the following conjugates: IgG-HRP (for comparative purposes), Ag/Pt NC-anti-BSA IgG of the invention (obtained as disclosed above) and Au/Pt NC-anti-BSA IgG of the invention (obtained as disclosed above).

Figure 13:
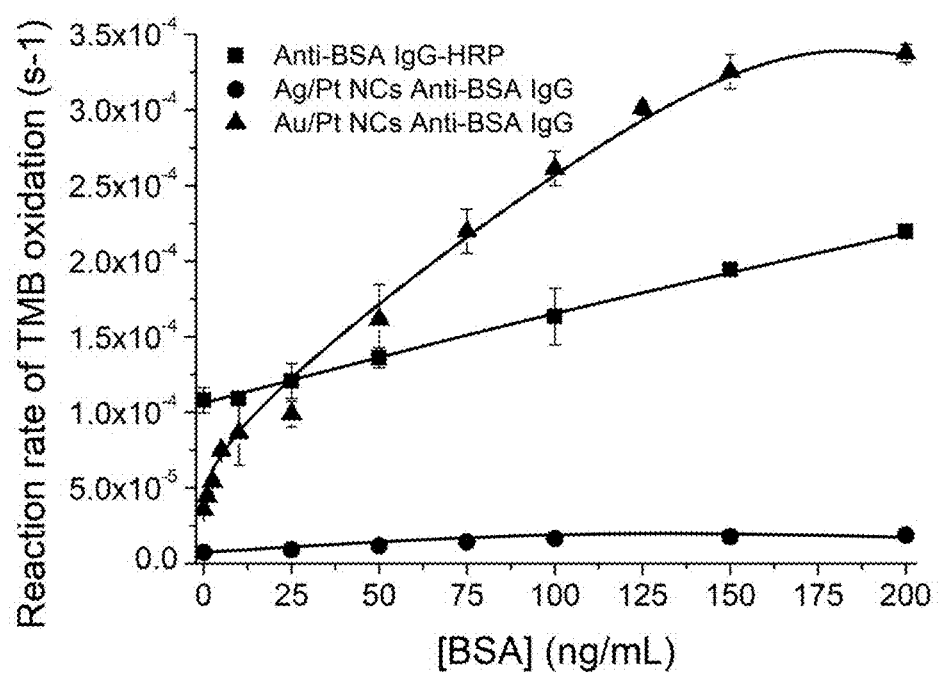
FIG. 13: Calibration curve of the direct sandwich ELISA system based on IgG-HRP, Ag/Pt NC-anti-BSA IgG and Au/Pt NCs Anti-BSA IgG using BSA as a target analyte.

The direct sandwich test was performed following the protocol provided above under items 9 and 10 above, determining the TMB oxidation reaction rate for different concentrations of BSA. To that end, the amount of conjugate added in each case was: 0.033 µg/mL for Anti-BSA IgG-HRP, 80 µg/mL for Ag/Pt NC-anti-BSA IgG and 8.325 for Au/Pt-NCs IgG From the calibration line obtained for each case, the limit of detection (LOD) was calculated as:

LOD=3×sd/slope, wherein "sd" means the standard deviation of the low concentration Thus, it was found that when the IgG-HRP was used, the limit of detection was about 52.03 ng/mL, whereas when the NCs of the invention were used the limit of detection was dramatically reduced 56 times (when Au/Pt NC-anti-BSA IgG was used) or up to 11 times (when Ag/Pt NC-anti-BSA IgG was used). See Table 1 below and FIG. 13:

TABLE 1

|  | St. dev. control | Initial slope | LOD (ng/mL) |
| --- | --- | --- | --- |
| IgG-HRP | 9.61E−06 | 5.54E−07 | 52.03 |
| Ag/Pt NCs-IgG | 3.27E−07 | 9.44E−08 | 10.40 |
| Au/Pt NCs-IgG | 2.40E−06 | 7.72E−06 | 0.93 |

Therefore, these data support the value of the conjugates of the invention in the field of immunoassays: the reduction in the limit of detection could allow the physician the detection/diagnostic in early stages of the disease, wherein the analyte amount is not high, which could improve the life expectation in particular disease conditions.

CITATION LIST

Liu J. et al., "One-step synthesis of antibody-stabilized aqueous colloids of noble metal nanoparticles", Colloids and Surfaces A: Physicochemical and Engineering Aspects, 2012, 404, pages 112-118.

Signor L. et al., "Matrix-assisted Laser Desorption/Ionization Time of Flight (MALDI-TOF) Mass Spectrometric Analysis of Intact Proteins Larger than 100 kDa", J. Vis. Exp., 2013, 79.

Morrison S. L. et al., "Chimeric human antibody molecules: mouse antigen-binding domains with human constant region domains", PNAS, 1984, 21, 6851:6855.

The invention claimed is:

1. A conjugate comprising:
   a metallic nanocluster (NC), and
   an antibody (Ab),
   wherein the NC has an average size less than 3 nm;
   wherein the conjugate comprises;
      one single NC embedded within the antibody and covalently bound to —S—
      moieties in the hinge region of the antibody;
   wherein the antibody maintains its binding ability; and
   wherein the conjugate has a catalytic activity selected from peroxidase-like or photocatalytic activity.

2. The conjugate of claim 1, wherein the metallic nanocluster is made of (i) one or more different metals; (ii) two different metals; or (iii) a metallic salt.

3. The conjugate of claim 2, wherein the one or more different metals are selected from the group consisting of Au, Ag, Pt, Cd, Cu, Fe, and Co; or, alternatively, the metallic salt is selected from the group consisting of CdS, ZnS, HgS, CdSe, ZnSe, HgSe, CdTe, ZnTe, HgTe, $CeO_2$, $TiO_2$, and ZnO.

4. The conjugate of claim 1, wherein the antibody is an IgG antibody.

5. The conjugate of claim 1 selected from the group consisting of:
(a) a conjugate consisting of a nanocluster made of Au and Pt, which is covalently bound to —S— moieties from the hinge region of the antibody;
(b) a conjugate consisting of a nanocluster made of Ag and Pt, which is covalently bound to —S— moieties from the hinge region of an antibody; and
(c) a conjugate consisting of a nanocluster made of CdS, which is covalently bound to —S— moieties from the hinge region of an antibody,
wherein the nanocluster in any of the conjugates (a) to (c) is from 1 to 2.3 nm in size.

6. A process for preparing the conjugate of claim 1, comprising the step of:
(a) mixing an aqueous metallic solution comprising one or more different metal ions with a solution comprising the antibody and a buffer; wherein:
(i) the antibody is at excess weight with respect to the total weight of metal ions in the solution,
(ii) the process being performed at pH and temperature conditions which maintain the native three-dimensional configuration of the antibody; and
(iii) when the nanocluster is made of one or two different metals, the process further comprising the steps of:
(b) adding a reducing agent to the mixture resulting from step (a), provided that the antibody is at an excess weight ratio with respect to the weight of reducing agent; and
(c) removing the residual reducing agent and free metal ions from the solution.

7. The process of claim 6, wherein the solution comprising the antibody and the buffer has a pH from 6 to 8.

8. The process of claim 6, wherein the solution comprising the antibody and the buffer has a pH about 7.

9. The process of claim 6, wherein the weight ratio of antibody to reducing agent is from $1:10^{-6}$ to 1:0.9; and the weight ratio of antibody to total weight of metal ions is from $1:10^{-6}$ to 1:0.9.

10. The process of claim 6, wherein prior to the addition of the reducing agent, the solution resulting from step (a) is maintained in the dark.

11. A kit comprising the conjugate of claim 1, the kit further comprising one or more reagents selected from a solid support, buffer solutions, washing solutions, blocking agents, enzymatic substrates, or secondary antibodies.

12. An aqueous composition comprising the conjugate of claim 1 and a buffer.

13. An in vitro method for determining the presence of an analyte in a sample, the method comprising the step of contacting the sample with the conjugate of claim 1 with a detectable enzymatic substrate, and quantifying the catalytic activity.

14. A conjugate comprising:
a metallic nanocluster (NC), and
an antibody (Ab),
wherein the NC has an average size less than 3 nm;
wherein the conjugate comprises:
one single NC embedded within the antibody and covalently bound to —S—
moieties in the hinge region of the antibody; and
wherein the antibody maintains its binding ability;
wherein the conjugate is made by a method comprising the step of:
(i) mixing an aqueous metallic solution comprising one or more different metal ions with a solution comprising the antibody and a buffer; wherein:
the antibody is at excess weight with respect to the total weight of metal ions in the solution,
the process being performed at pH and temperature conditions which maintain the native three-dimensional configuration of the antibody; and
wherein when the nanocluster is made of one or two different metals, the method further comprises the steps of:
(ii) adding a reducing agent to the mixture resulting from step (i), provided that the antibody is at an excess weight ratio with respect to the weight of reducing agent; and
(iii) removing the residual reducing agent and free metal ions from the solution.

15. The process of claim 14, wherein the solution comprising the antibody and the buffer has a pH from 6 to 8.

16. The process of claim 14, wherein the solution comprising the antibody and the buffer has a pH of about 7.

17. The process of claim 14, wherein the weight ratio of antibody to reducing agent is from $1:10^{-6}$ to 1:0.9; and the weight ratio of antibody to metal ions is from $1:10^{-6}$ to 1:0.9.

18. The process of claim 14, wherein prior to the addition of the reducing agent, the solution resulting from step (i) is maintained in the dark.

* * * * *